United States Patent
Kim

(10) Patent No.: US 9,953,662 B2
(45) Date of Patent: Apr. 24, 2018

(54) LOW-POWER SOUND WAVE RECEPTION METHOD AND MOBILE DEVICE USING THE SAME

(71) Applicant: SOUNDLLY INC., Incheon (KR)

(72) Inventor: Tae Hyun Kim, Seoul (KR)

(73) Assignee: SOUNDLLY INC., Incheon (KR)

( * ) Notice: Subject to any disclaimer, the term of this patent is extended or adjusted under 35 U.S.C. 154(b) by 0 days.

(21) Appl. No.: 15/037,299

(22) PCT Filed: Nov. 20, 2014

(86) PCT No.: PCT/KR2014/011184
§ 371 (c)(1),
(2) Date: May 17, 2016

(87) PCT Pub. No.: WO2015/076577
PCT Pub. Date: May 28, 2015

(65) Prior Publication Data
US 2016/0293183 A1    Oct. 6, 2016

(30) Foreign Application Priority Data
Nov. 20, 2013    (KR) .................. 10-2013-0141504

(51) Int. Cl.
*G10L 25/51*    (2013.01)
*G10L 17/02*    (2013.01)
(Continued)

(52) U.S. Cl.
CPC .............. *G10L 25/51* (2013.01); *G10L 17/02* (2013.01); *H04B 11/00* (2013.01);
(Continued)

(58) Field of Classification Search
CPC ... G10L 25/21; G10L 17/02; G10L 2025/783; H04B 11/00; H04M 1/72519; H04M 2250/74; H04W 52/0229; H04W 52/0251
See application file for complete search history.

(56) References Cited

U.S. PATENT DOCUMENTS 5,983,186 A    11/1999    Miyazawa et al. ........... 704/275
6,173,062 B1    1/2001    Dibachi et al. ............... 381/312
(Continued)

FOREIGN PATENT DOCUMENTS

JP    2001-045146    2/2001    ............. H04M 1/73
JP    3434827    8/2003    ............. H04R 25/00
(Continued)

OTHER PUBLICATIONS

International Search Report (ISR) dated Mar. 9, 2015 in PCT/KR2014/011184 published as WO 2015/076577.
(Continued)

*Primary Examiner* — Sonia Gay
(74) *Attorney, Agent, or Firm* — Harness, Dickey & Pierce, P.L.C.

(57) ABSTRACT

A low-power sound wave reception method in a computer which includes a microphone, a memory which stores at least one reference pattern, and a computer processor is provided. The low-power sound wave reception method includes: when a sound wave signal having an intensity greater than or equal to a threshold value is detected by the microphone, comparing the sound wave signal and the at least one reference pattern stored in the memory; and when there is a reference pattern matching the sound wave signal, turning on the computer processor, and deactivating the reference pattern matching the sound wave signal (excluding the deactivated reference pattern from the comparing step).

9 Claims, 17 Drawing Sheets

(51) Int. Cl.
*H04B 11/00* (2006.01)
*G10L 25/78* (2013.01)
*H04M 1/725* (2006.01)
*H04W 52/02* (2009.01)

(52) U.S. Cl.
CPC ... *G10L 2025/783* (2013.01); *H04M 1/72519* (2013.01); *H04M 2250/74* (2013.01); *H04W 52/0229* (2013.01); *H04W 52/0251* (2013.01); *Y02B 60/50* (2013.01)

(56) References Cited

U.S. PATENT DOCUMENTS

| | | | | |
|---|---|---|---|---|
| 6,349,222 | B1 | 2/2002 | Hafiz | 455/569 |
| 7,203,645 | B2* | 4/2007 | Pokhariyal | G10L 15/26 704/251 |
| 7,505,910 | B2* | 3/2009 | Kujirai | G01C 21/3608 704/270.1 |
| 2003/0135515 | A1* | 7/2003 | Gray | G06F 8/31 |
| 2012/0087211 | A1 | 4/2012 | Lee et al. | 367/93 |
| 2013/0223635 | A1 | 8/2013 | Singer et al. | 381/56 |
| 2014/0334645 | A1* | 11/2014 | Yun | G10L 15/08 381/110 |
| 2014/0358552 | A1* | 12/2014 | Xu | G06F 1/3234 704/275 |

FOREIGN PATENT DOCUMENTS

| | | | | |
|---|---|---|---|---|
| KR | 10-2001-0101923 | 11/2011 | | H04B 1/38 |
| KR | 10-2012-0037855 | 4/2012 | | G08B 13/16 |
| KR | 10-2013-0129934 | 11/2013 | | H01L 51/52 |
| KR | 10-2013-0129951 | 11/2013 | | H01L 51/56 |

OTHER PUBLICATIONS

Extended European Search Report from corresponding European Application No. European Application No. 14863921.4 dated Jun. 26, 2017.

* cited by examiner

LOW-POWER SOUND WAVE RECEPTION METHOD AND MOBILE DEVICE USING THE SAME

CROSS-REFERENCE TO RELATED APPLICATIONS

This application is a national phase application of PCT Application No. PCT/KR2014/011184, filed on 20 Nov. 2014, which claims benefit of Korean Patent Application 10-2013-0141504, filed on 20 Nov. 2013. The entire disclosure of the applications identified in this paragraph are incorporated herein by reference.

FIELD

The present invention relates to a low-power sound wave reception method and a mobile device using the same.

BACKGROUND

As mobile devices such as smart phones have been increasingly used, the functions of the mobile devices have become diversified. In particular, the function of detecting a voice using a microphone mounted in the mobile device to perform voice call and video call functions is one of the natural user-device interfaces and is being utilized for various purposes. For example, services such as Siri of Apple or Now of Google provide convenience of interpreting a user's voice as a command and providing specific information or activating a function. In addition, most of the mobile devices are provided with a voice activation function which detects voice commands and activates mobile devices even when the mobile devices are deactivated to reduce power consumption.

For example, Korean Patent Publication No. 10-2001-0101923 of Qualcomm Incorporated (Nov. 15, 2001) (titled "Voice Activated Mobile Telephone Call Answerer) discloses a mobile telephone call answerer which is activated by a voice.

The microphone of the mobile device may be used to receive sound waves modulated from digital information, in addition to receiving a command or acquiring information using a human voice. Such a function may be performed using the microphone and an audio processing hardware device unlike the original functions of the microphone, and may be used to transmit additional information to a user's mobile device using a sound system, for example, an announcement system in a building or a sound wave transmission-dedicated speaker, and receive information through the microphone.

For example, Korean Patent Application No. 10-2013-0129934 (Oct. 30, 2013) filed by the same applicant as the applicant of the present application (titled "Method and System for Estimating Location of Mobile Terminal Using Sound System, and Sound System") discloses technology for providing information to a mobile device using a microphone, etc.

In addition, there is an application which can deliver information to a mobile device using sound waves as a voice command for activating the mobile device which is deactivated (or in a standby state) to reduce power consumption, regardless of whether the mobile device is activated/deactivated.

However, to transmit sound waves modulated from digital information, uni-directional communication is normally used. In this case, in order for a user's mobile device to receive micro sound waves, corresponding information should be transmitted. Therefore, a sound system which transmits sound waves or a sound wave transmission-dedicated speaker should transmit sound waves continuously and repeatedly.

For example, Korean Patent Application No. 10-2013-0129951 (Oct. 30, 2013) (titled "Broadcasting Method and System Using Non-audible Sound and Mixer) discloses technology for transmitting sound waves repeatedly.

However, when sound waves are repeatedly transmitted and are treated as a voice command to activate a mobile device as described above, the mobile device of a user who is in a place to which the corresponding sound waves are transmitted is continuously activated and does not enter an deactivation state. This may cause serious battery loss and thus the technology for activating a mobile device using a voice may be a cause of degradation in the technology of sound waves for delivering digital information.

In addition, since the mobile device uses power of limited capacity such as a battery, there is always a demand for low-power-based technology.

DISCLOSURE

Technical Problem

An exemplary embodiment of the present invention provides a lower-power sound wave reception method and a mobile device using the same.

Another exemplary embodiment of the present invention provides an integrated circuit which can receive sound waves with low power.

Technical Solution

According to an embodiment of the present invention, there is provided a low-power sound wave reception method in a computer which includes a microphone, a sound wave intensity measurer which measures an intensity of a sound wave detected by the microphone, a memory which stores at least one reference pattern, and a computer processor, the low-power sound wave reception method including: when a sound wave signal having an intensity greater than or equal to a threshold value is measured by the sound wave intensity measurer, comparing the sound wave signal having the intensity greater than or equal to the threshold value and the at least one reference pattern stored in the memory; and when there is a reference pattern matching the sound wave signal having the intensity greater than or equal to the threshold value, turning on the computer processor, and deactivating the reference pattern matching the sound wave signal having the intensity greater than or equal to the threshold value (excluding the deactivated reference pattern from the comparing step).

According to another embodiment of the present invention, there is provided a mobile device including a microphone, a sound wave intensity measurer which measures an intensity of a sound wave detected by the microphone, a memory which stores at least one reference pattern, and a computer processor, the mobile device further including: a comparator which, when a sound wave signal having an intensity greater than or equal to a threshold value is measured by the sound wave intensity measurer, compares the sound wave signal and the at least one reference pattern stored in the memory, and when there is a reference pattern matching the sound wave signal as a result of the comparing, turns on the computer processor; and a low-power sound wave reception management computer program which is operated under the control of the turned-on computer processor, and deactivates the reference pattern matching the sound wave signal (excludes the deactivated reference pattern from the comparison object).

According to another embodiment of the present invention, there is provided an integrated circuit (IC) which is used in a mobile device including a memory for storing at least one reference pattern and a sound wave intensity measurer for measuring an intensity of a sound wave, the IC including: a comparator which compares a sound wave signal having an intensity greater than or equal to a threshold value and the at least one reference pattern stored in the memory, and determines whether there is a reference pattern matching the sound wave signal having the intensity greater than or equal to the threshold value; and a low-power sound wave reception management computer program which deactivates the reference pattern matching the sound wave signal having the intensity greater than or equal to the threshold value from among the at least one reference pattern stored in the memory (excludes the deactivated reference pattern from the comparison object).

According to another embodiment of the present invention, there is provided a computer readable medium which records a program on a computer which includes a microphone, a sound wave intensity measurer which measures an intensity of a sound wave detected by the microphone, a memory which stores at least one reference pattern, and a computer processor, the program executing a method including: measuring, by the sound wave intensity measurer, a sound wave signal having an intensity greater than or equal to a threshold value; when there is a reference pattern matching the sound wave signal having the intensity greater than or equal to the threshold value, turning on the computer processor; and deactivating the reference pattern matching the sound wave signal having the intensity greater than or equal to the threshold value (excluding the deactivated reference pattern from the comparing step).

Advantageous Effects

According to one or more embodiments of the present invention, in detecting an audible or non-audible sound wave modulated from digital information, which is repeatedly transmitted from a specific space for sending additional information, a mobile device can be prevented from switching from the standby state to the activation state after receiving the sound wave, and thus power consumption in the mobile device can be minimized.

According to one or more embodiments of the present invention, when a user of a mobile device continuously receives different audible or non-audible sound waves modulated from digital information, the already received sound wave is prevented from being repeatedly received and thus the mobile device can be prevented from switching from the standby state to the activation state due to the corresponding sound wave. Therefore, power consumption in the mobile device can be minimized.

EXPLANATION OF SIGNS

Figure 1:
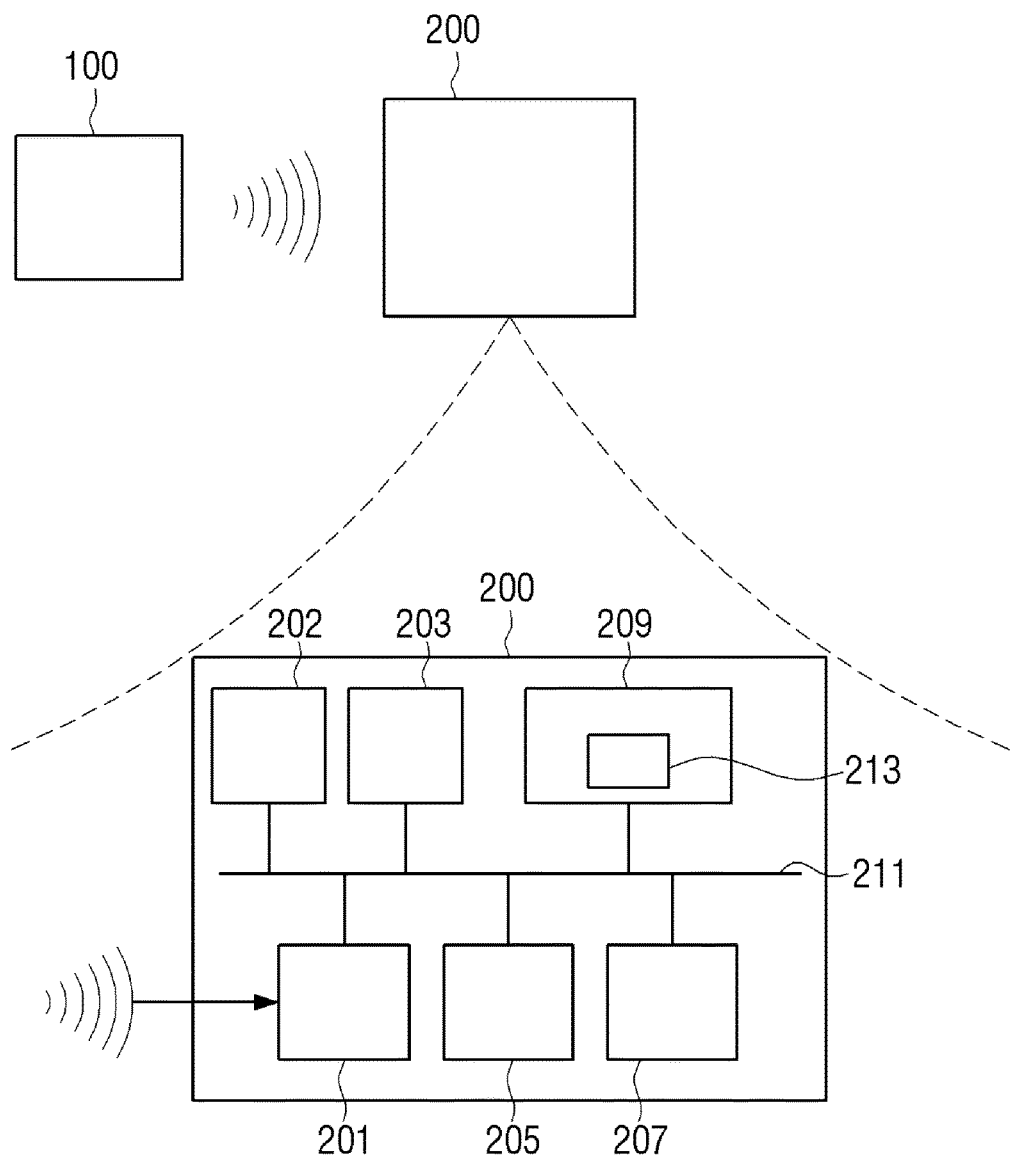
FIG. 1 is a view to illustrate a low-power sound wave reception system according to an exemplary embodiment of the present invention.

| | |
|---|---|
| 10: Storage | 20: DAC |
| 30: Mixer | 40: AMP |
| 50: Speaker | 100: Sound wave generation device |
| 200: Computer | 201: Microphone |
| 203: ADC | 205: Comparator |
| 207: Memory | 209: Computer processor |
| 211: Bus | 213: Low-power sound wave reception computer program |

BEST MODE

Exemplary embodiments will now be described more fully with reference to the accompanying drawings to clarify aspects, other aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" another element, the element can be directly on another element or intervening elements. In addition, in the drawings, thickness of elements may be exaggerated to effectively explain the technical features.

If the terms such as 'first' and 'second' are used to describe elements, these elements should not be limited by such terms. These terms are used for the purpose of distinguishing one element from another element only. The exemplary embodiments include their complementary embodiments.

The expression "elements A and B are connected (or coupled, secured or combined) with each other" used in the detailed descriptions and/or claims of the present application implies not only a direct connection between the elements A and B but also an indirect connection via one or more other elements.

The terms used herein are for the purpose of describing particular exemplary embodiments only and are not intended to be limiting. As used herein, the singular forms are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Definition of Terms

To describe the present invention, terms or expressions to be used in this specification will be defined as follows:

The term "detecting" refers to "converting into an electric signal."

The term "sound wave having an intensity greater than or equal to a threshold value" refers to "sound wave which is converted into an electric signal having an intensity greater than or equal to a threshold value."

The term "deactivating" refers to "excluding from comparison objects of reference patterns."

The term "program" refers to a set of commands suitable for processing through a computer.

The term "program recording medium" refers to a "computer readable medium which records a program to install, execute, or distribute the program."

The term "comparing a sound wave signal and a reference pattern" may refer to one of the following two cases:
a case in which unique data which is derived from a part or entirety of a sound wave signal (for example, data which is outputted when a sound wave signal is inputted to a hash function) and a reference patter are compared; and
a case in which a sound wave signal and a reference pattern are compared.

The term "sound wave signal matching a reference pattern" may refer to one of the following two cases:
a case in which unique data derived from a sound wave signal matches reference data; and
a case in which data matching a reference pattern is included in a sound wave signal.

FIG. 1 is a view to illustrate a low-power sound wave reception system according to an exemplary embodiment of the present invention.

Referring to FIG. 1, the low-power sound wave reception system according to an exemplary embodiment of the present invention includes a sound wave generation device 100 and a computer 200.

The sound wave generation device 100 is a device which generates and outputs a sound wave.

The sound wave outputted from the sound wave generation device 100 may include a signal modulated from digital information and may be a sound wave of a non-audible or audible band.

The sound wave outputted from the sound wave generation device 100 may include sound waves M1, M2, . . . of a non-audible or audible band, which include signals modulated from digital information, and voices and sounds S1, S2, . . . of an audible band, which do not include digital information.

Figure 2:
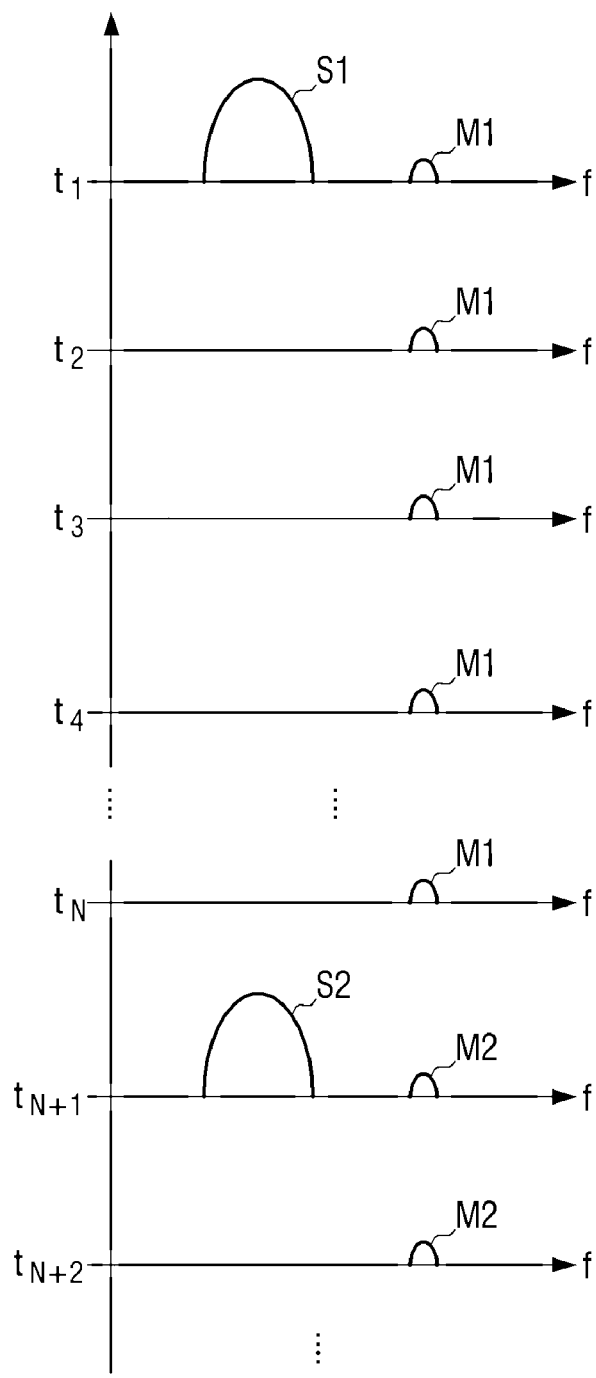
FIG. 2 is a view to illustrate a sound wave signal which is used in the low-power sound wave reception system according to an exemplary embodiment of the present invention.

Alternatively, although the sound wave outputted from the sound wave generation device 100 includes a sound wave expressed by S1 or S2 (a sound wave corresponding to a voice and a sound of an audible band which do not include digital information) in FIG. 2, the sound wave does not necessarily include a sound wave S1 or S2. This will be explained below with reference to FIG. 13.

Alternatively, the sound wave expressed by M1 or M2 (a sound wave of a non-audible or audible band which includes a signal modulated from digital information) has a frequency higher than that of the sound wave expressed S1 or S2 in FIG. 2, but this is merely an example. The sound wave expressed by M1 or M2 may have a frequency lower than that of the sound wave expressed by S1 or S2.

Alternatively, the sound wave outputted from the sound wave generation device 100 includes one sound wave expressed by M1 or M2 (a sound wave of a non-audible or audible band which includes a signal modulated from digital information) in FIG. 2, but this is merely an example. The sound wave outputted from the sound wave generation device 100 may include a plurality of non-audible or audible sound waves including signals modulated from digital information. This will be explained below with reference to FIG. 14.

The digital information included in the sound wave outputted from the sound wave generation device 100 may include additional information for determining whether the sound wave is successfully received or not. For example, the sound wave may include error detection information as additional information.

The "digital information" in the "signal modulated from digital information" may be information which is necessary for a specific purpose, such as payment, location estimation, video content recognition, etc. Herein, the formation for payment, location estimation, or video content recognition is merely an example and it should be noted that the "digital information" of the present invention is not limited to such information.

The computer 200 may detect the sound wave outputted from the sound wave generation device 100, and, when the detected sound wave signal has an intensity greater than or equal to a predetermined threshold value, compare the sound wave and a pre-stored at least one reference pattern (a comparison object).

According to the present invention, the sound wave to be compared with the reference pattern (comparison object) is a sound wave which has intensity greater than or equal to the predetermined threshold value from among the sound waves detected by a microphone.

As a result of the comparing, when the sound wave signal having the intensity greater than or equal to the predetermined threshold value matches the reference pattern, the computer 200 turns on a computer processor provided therein and deactivates the reference pattern matching the sound wave signal from among the pre-stored at least one reference pattern.

Alternatively, when there exists the reference pattern matching the sound wave signal and the computer 200 turns on the computer processor provided therein, the computer processor or a program executed by the computer processor determines whether a predetermined condition (referred to as a "deactivating condition") is satisfied or not. When the deactivating condition is satisfied, the reference pattern matching the sound wave signal is deactivated from among the pre-stored at least one reference pattern. Herein, the entity which determines whether the deactivating condition is satisfied or not or deactivates the reference pattern may be the computer processor or the program executed by the computer processor.

Hereinafter, the deactivating condition will be explained by way of an example.

When the computer processor is turned on, the computer processor or the program executed by the computer processor determines whether the reference pattern (the reference pattern which is determined as matching the sound wave signal) indicates digital information or not.

When the reference pattern indicates the digital information, the computer processor may execute a program for restoring the digital information (referred to as a "restoration program").

The restoration program restores the digital information from the sound wave (the sound wave which is determined as matching the reference pattern).

When the restoration program succeeds in restoring and thus the digital information is acquired from the sound wave signal, it is determined that the deactivating condition is satisfied and the reference pattern matching the sound wave signal is deactivated.

In determining whether the restoration succeeds or not, the additional information included in the sound wave may be used. For example, error detection information may be used as the additional information.

In the above-described example, it is determined whether the deactivating condition is satisfied based on whether the digital information included in the sound wave is restored or not. However, this is merely an example and other conditions may be used as the deactivating condition.

Alternatively, the entity which determines whether the deactivating condition is satisfied or not may be implemented by using hardware.

In this case, the entity which determines whether the deactivating condition is satisfied or not may determine whether the reference pattern (the reference pattern which is determined as matching the sound wave signal) indicates the digital information or not.

When the reference pattern indicates the digital information, the operation of restoring the digital information may be performed in a hardware level.

When the restoration succeeds and thus the digital information is acquired from the sound wave signal, it is determined that the deactivating condition is satisfied and the computer processor is turned on.

The turned-on computer processor executes a program for deactivating the reference pattern matching the sound wave signal.

The computer 200 may select methods presented below in order to deactivate the reference pattern. These methods are merely examples and it should be understood by a person skilled in the art that the present invention is not limited to these methods.

First Method

The reference pattern matching the sound wave is deleted from a memory which stores reference patterns (a memory which stores reference patterns to be compared with the sound wave signal, that is, comparison objects), and the deleted reference pattern is stored (backed up) in another storage (for example, a storage which is additionally provided in the computer 200 or is connected with the computer 200 through a network).

Second Method

A flag which corresponds to the reference pattern matching the sound wave signal (a flag which indicates deactivation/activation) is deactivated. The second method uses the flag. The flag corresponds to every reference pattern to be compared and indicates whether the reference pattern corresponding thereto is deactivated or not.

In addition, the computer 200 may activate an existing reference pattern which has been deactivated. For example, when a predetermined time elapses from the time when the reference pattern was deactivated, the computer 200 activates the deactivated reference pattern.

The activation operation of the computer 200 may be the reverse operations of the above-described first and second methods.

For example, the reference pattern which is backed up in another storage (for example, a storage which is additionally provided in the computer 200 or connected with the computer 200 through a network) is re-stored in the memory which stores the reference patterns.

In another example, a flag indicating a deactivation state may be converted into an activation state.

The computer 200 may activate the existing reference pattern which has been deactivated ("deactivated reference pattern") at various times.

For example, the computer 200 may activate the deactivated reference pattern when a predetermined time elapses from the time of deactivation.

In another example, when there exists the reference pattern ("current reference pattern") matching the sound wave having the intensity greater than or equal to the threshold value, the computer 200 may turn on the computer processor provided therein, exclude the current reference pattern, and activate the existing reference pattern which has been deactivated until the computer processor is turned on.

The computer 200 for performing the above-described operations may be a computer such as a smart phone, a tablet PC, a notebook PC, a glasses/watch type wearable device, or a cellular phone. However, these are merely examples and the computer 200 may be a server computer or a desktop computer.

The computer 200 according to an exemplary embodiment of the present invention may include a microphone 201, a sound wave intensity measurer 202, an analogue-digital converter (ADC) 203, a comparator 205, a memory 207, a computer processor 209, a bus 211, and a low-power sound wave reception computer program 213. Herein, the bus 211 may serve as a communication path between the elements.

The microphone 201 may detect a sound wave, that is, convert the sound wave into an electric signal.

The sound wave intensity measurer 202 may measure the sound wave to determine whether the sound wave converted into the electric signal by the microphone 201 has an intensity greater than or equal to a threshold value. The sound wave intensity measurer 202 may be implemented by using hardware.

The ADC 203 may convert the sound wave having the intensity greater than or equal to the threshold value into digital data. When the intensity of the sound wave converted into the electric signal by the microphone 201 is greater than or equal to the threshold value, the ADC 203 may be supplied with power and may perform operations. That is, the ADC 203 may convert the sound wave signal having the intensity greater than or equal to the threshold value into digital data.

The comparator 205 may compare the sound wave which is converted into the digital format by the ADC 203 and at least one reference pattern stored in the memory 207. For example, the comparator 205 may be implemented by using hardware. When the intensity of the sound wave converted into the electric signal by the microphone 201 is measured as being greater than or equal to the threshold value, the comparator 205 may be provided with power with the ADC 203 and may perform operations. That is, the comparator 205 may compare the sound wave converted into the digital format by the ADC 203 and the at least one reference pattern stored in the memory 207.

The memory 207 is a computer readable medium which records a program.

The memory 207 may store at least one reference pattern. Herein, the reference pattern may be biometric information such as a unique voice of a user of the computer 200, information for identifying a location, information for payment, or information for recognizing a video content. However, it should be understood by a person skilled in the art that the reference pattern used in the present invention is not limited to the biometric information, information for identifying a location, information for payment, or information for recognizing a video content.

The memory 207 may store one or more reference patterns.

The reference pattern stored in the memory 207 may be a comparison object which is used in the comparator 205.

The reference patterns stored in the memory 207 according to an exemplary embodiment of the present invention have flags (data which indicates whether the reference pattern is activated or deactivated) corresponding thereto, and the flags corresponding to the activated reference patterns may be set to indicate the activation state (for example, set to "1") and the flags corresponding to the deactivated reference patterns may be set to indicate the deactivation state (for example, set to "0").

As a result of comparing the sound wave having the intensity greater than or equal to the threshold value and the reference patterns stored in the memory 207 (the activated reference patterns), when the sound wave having the intensity greater than or equal to the threshold value matches at least one reference pattern, the comparator 205 turns on the computer processor 209 (for example, supplies power).

When the computer processor 209 is turned on, the computer 200 may perform: i) a 'predetermined operation'; ii) an operation of deactivating the reference pattern; iii) an operation of activating the existing reference pattern which has been deactivated; iv) an operation of restoring digital information from the sound wave; and v) an operation of determining whether the deactivating condition is satisfied or not (for example, an operation of determining whether the digital information is successfully restored from the sound wave.

From among the operations i) to v), operations for low power consumption may be performed by a low-power sound wave reception management computer program, and the other operations may be performed by a separate computer program. For example, the operations ii) to iv) are for low power consumption and are performed by the low-power sound wave reception management computer program, and the other operation i) may be performed by a separate computer program (not shown) (hereinafter, referred to as a "normal computer program") from the low-power sound wave reception management computer program.

The term "program" mentioned as being turned on by the computer processor 209 and operated is used to indicate programs including the low-power sound wave reception management computer program and the normal computer program.

The "predetermined operation" may be a pre-defined operation corresponding to each of the reference patterns.

For example, the "predetermined operation" may be an operation of letting a user log in the computer 200. In this case, the reference pattern may be a pattern which is created by a user's voice and this reference pattern may be a password for logging in the computer 200.

Hereinafter, the present invention will be described on the assumption that the computer processor 209 is an application processor (hereinafter, referred to as an "AP"). The AP is merely an example of the computer processor 209 and thus it should be understood by a person skilled in the art that the present invention is not limited to the AP.

According to an exemplary embodiment of the present disclosure, the AP 209 may include a memory (not shown) in which the program 213 is loaded and operated. The program 213 may be stored in a storage (not shown) (a computer readable medium which records a program) included in the computer 200, and may be loaded into the memory (not shown) and executed under the control of the AP 209.

Herein, the program 213 may be configured to perform at least one operation of the above-described operations i) to v).

When the AP 209 is turned on, the program 213 may be loaded into the memory included in the AP 209 and executed.

The program 213 loaded into the memory (not shown) included in the AP 209 and executed includes a low-power sound wave reception management computer program and a normal computer program.

The low-power sound wave reception management computer program may perform a low-power consumption-related operation.

For example, the low-power sound wave reception management computer program may determine whether the deactivating condition is satisfied or not (for example, determine whether the digital information is successfully restored from the sound wave), and, when the deactivating condition is satisfied, may deactivate the reference pattern.

In addition, the low-power sound wave reception management computer program may activate the existing reference pattern which has been deactivated.

In addition, the low-power sound wave reception management computer program 213 may determine whether the digital information included in the sound wave is successfully restored or not using additional information (for example, error detection information) included in the sound wave.

Figure 6:
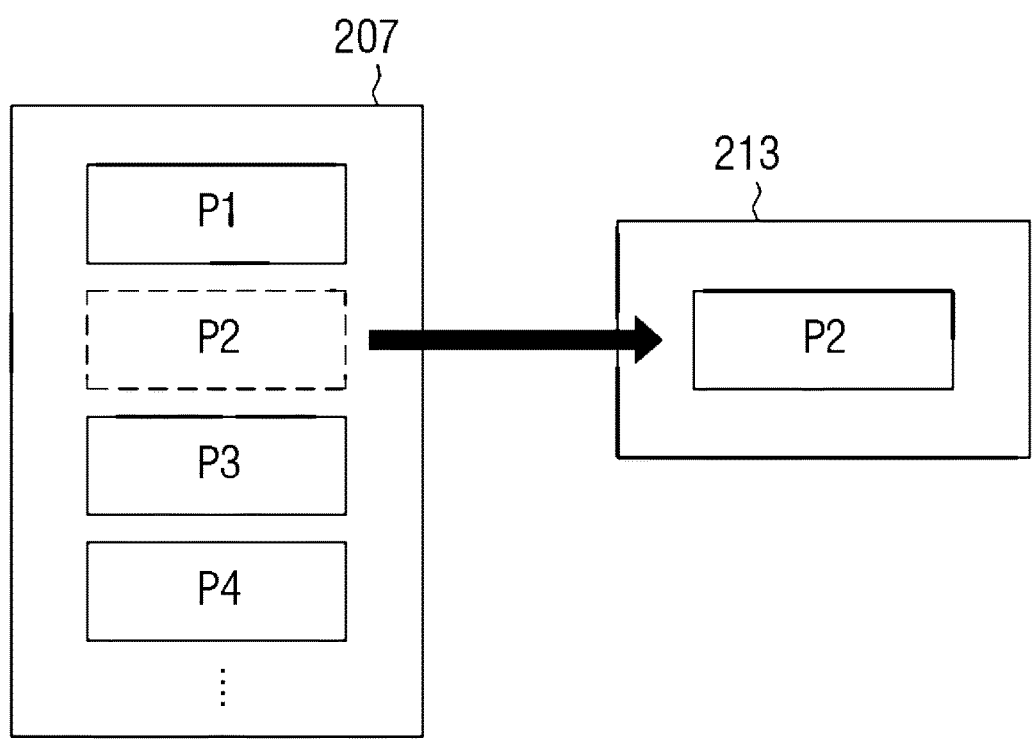
FIG. 6 is a view to illustrate a reference pattern deactivation operation according to an exemplary embodiment of the present invention.

Referring to FIG. 6, the operation of deactivating the current reference pattern will be explained on the assumption that one of a first case in which a reference pattern P2 matches the sound wave as a result of comparing the sound wave and the reference patterns stored in the memory 207 by the comparator 205, or a second case in which the reference pattern P2 matches the sound wave and the deactivating condition is satisfied is satisfied.

Referring to FIG. 6, the low-power sound wave reception management computer program 213 may remove the reference pattern P2 from the reference patterns stored in the memory 207 which stores the reference patterns, and store the reference pattern P2 in another storage 213. Herein, the storage 213 may be provided in the computer 200 or may be a device which is connected with the computer 200 through a network (for example, a network storage device such as a server device or an online storage service).

In another example, referring to FIG. 7, the operations of deactivating the current reference pattern and activating the deactivated reference pattern will be explained on the assumption that one of the first case in which the reference pattern P2 matches the sound wave, as a result of comparing the sound wave and the reference patterns stored in the memory 207 by the comparator 205, or the second case in which the reference pattern P2 matches the sound wave and the deactivating condition is satisfied is satisfied, and that an existing reference pattern P3 which has been deactivated is stored in the storage 213.

Figure 7:
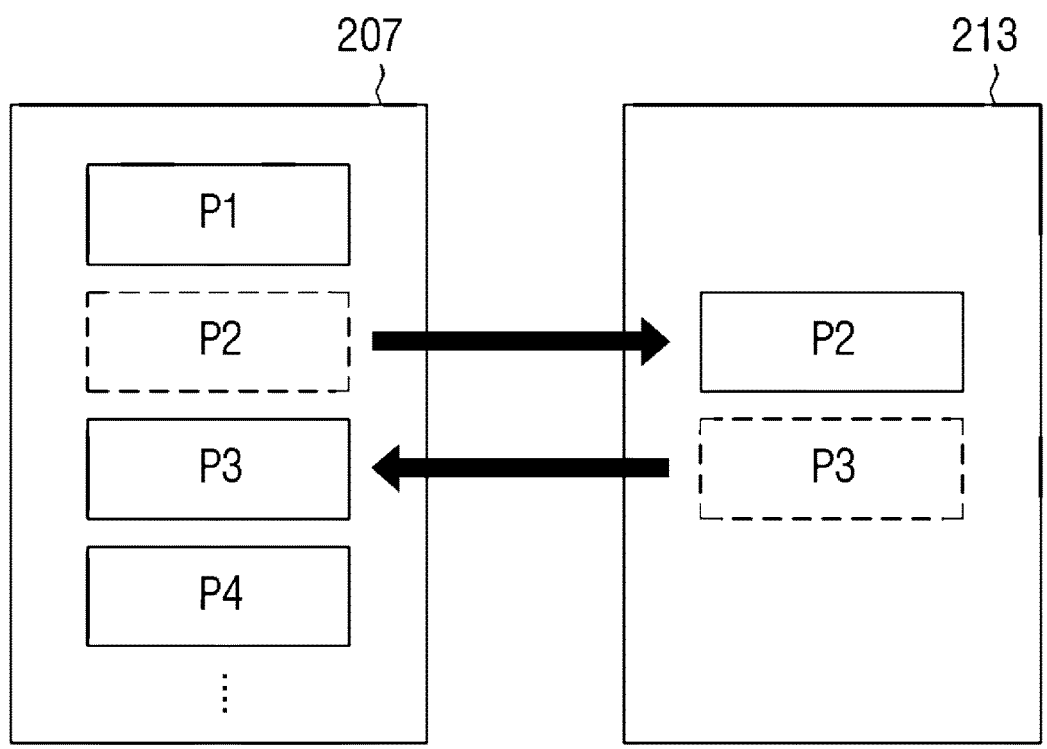
FIG. 7 is a view to illustrate reference pattern deactivation and activation operations according to another exemplary embodiment of the present invention.

Referring to FIG. 7, the low-power sound wave reception management computer program 213 may remove the reference pattern P2 from the reference patterns stored in the memory 207 which stores the reference patterns, and store the reference pattern P2 in another storage 213, and may store the reference pattern P3 backed up in another storage 213 in the memory 207. After finishing this operation, the reference patterns P1, P3, P4, . . . may be comparison objects, and the reference pattern P2 may not be a comparison object until the reference pattern P2 is activated.

In this case, the reference pattern P2 may not be used when the comparing operation is performed by the comparator 205.

In another example, referring to FIG. 8, the operations of deactivating the current reference pattern and activating the deactivated reference pattern will be explained on the assumption that one of the first case in which the reference pattern P2 matches the sound wave, as a result of comparing the sound wave and the reference patterns stored in the memory 207 by the comparator 205, or the second case in which the reference pattern P2 matches the sound wave and the deactivating condition is satisfied is satisfied, and that the existing reference pattern P3 which has been deactivated is stored in the storage 213.

Figure 8:
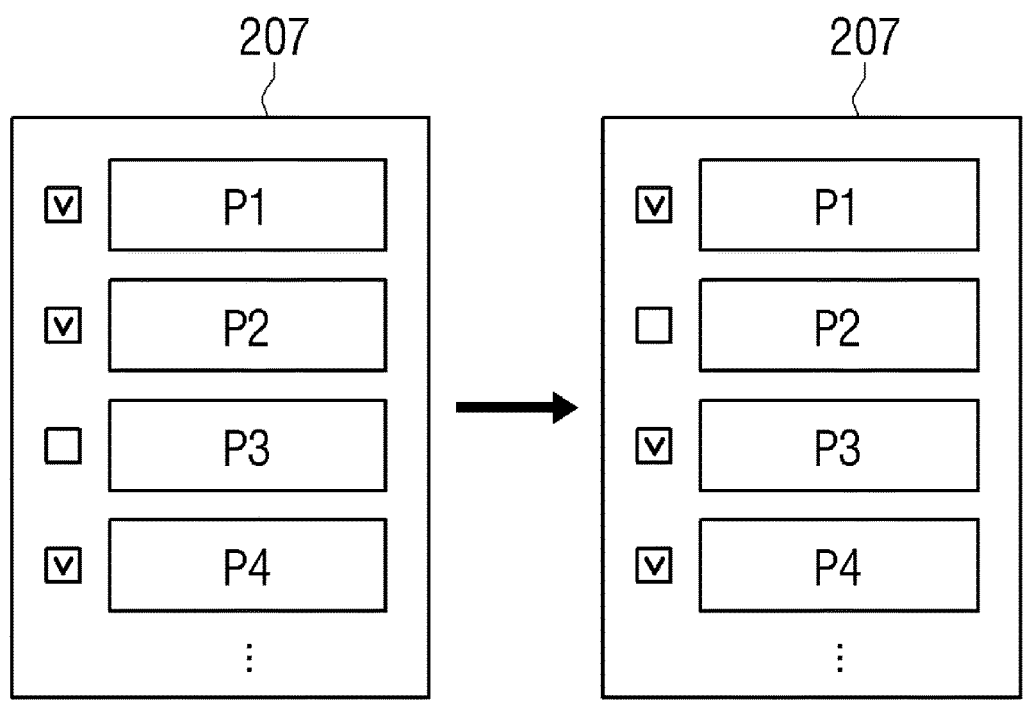
FIG. 8 is a view to illustrate reference pattern deactivation and activation operations according to another exemplary embodiment of the present invention.

Referring to FIG. 8, the low-power sound wave reception management computer program 213 may change the state of a flag corresponding to the reference pattern P2 from among the reference patterns stored in the memory 207 which stores the reference patterns to the deactivation state, and change the state of a flag corresponding to the reference pattern P3 to the activation state. The reference patterns P1, P3, P4, . . . may be comparison objects, and the reference pattern P2 may not be a comparison object until the reference pattern P2 is activated. Therefore, only the reference patterns which have the flags activated are used in the comparing operation and the reference pattern P2 is used.

In the above-described examples, the entity which determines whether the deactivating condition is satisfied or not is a program. Alternatively, the entity which determines whether the deactivating condition is satisfied or not may be implemented by using hardware. In this case, the computer 200 may further include hardware for determining whether the deactivating condition is satisfied or not.

Figure 9:
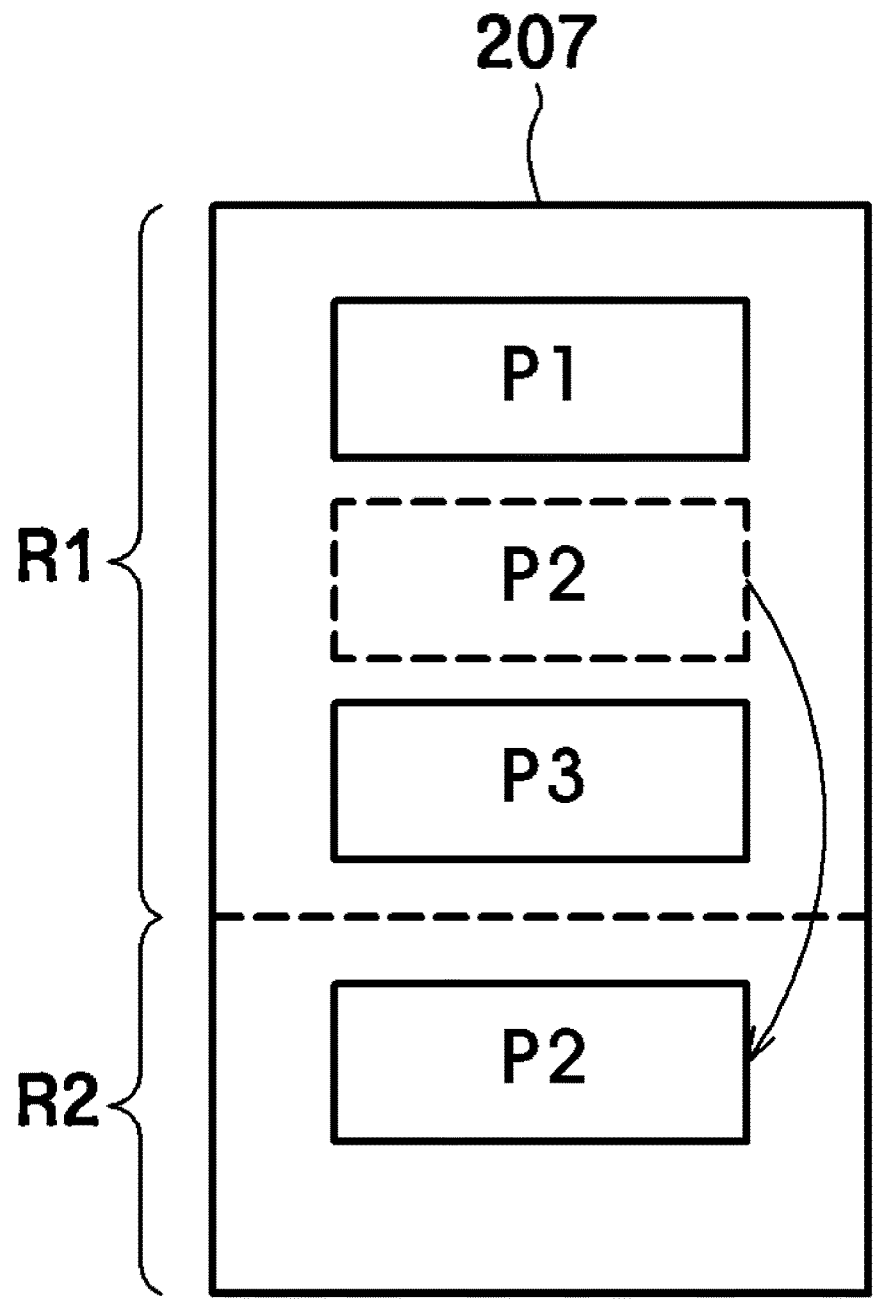
FIG. 9 is a view to illustrate a reference pattern deactivation operation according to another exemplary embodiment of the present invention.

FIG. 9 is a view to illustrate a reference pattern deactivation operation according to another exemplary embodiment of the present invention.

Referring to FIG. 9, the memory 207 of FIG. 1 may include at least two areas. Herein, the at least two areas may be an area R1 which stores the reference patterns, and an area R2 which backs up the reference patterns.

Referring to FIGS. 1 and 9, the operation of deactivating the current reference pattern will be explained on the assumption that one of the first case in which the reference pattern P2 matches the sound wave, as a result of comparing the sound wave and the reference patterns stored in the first area R1 of the memory 207 by the comparator 205, or the second case in which the reference pattern P2 matches the sound wave and the deactivating condition is satisfied is satisfied.

Referring to FIG. 9, the low-power sound wave reception management computer program 213 may remove the reference pattern P2 from the reference patterns stored in the first area R1 of the memory 207 which stores the reference patterns, and store the reference pattern P2 in the second area R2 of the memory 207.

According to one or more exemplary embodiments of the present invention as described above, the reference pattern data which has been deactivated once may be restored at a predetermined time and may be used as a comparison object.

Figure 11:
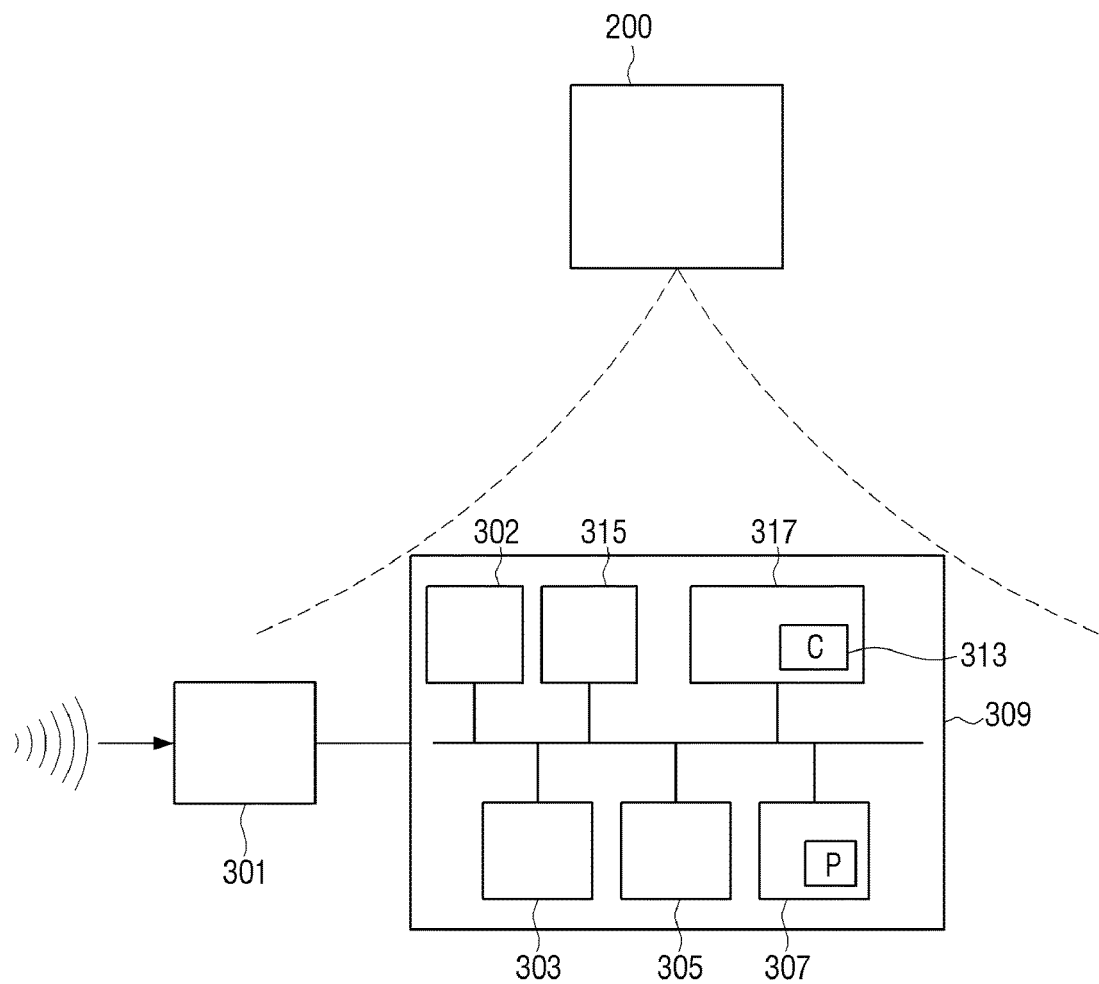
FIG. 11 is a view to illustrate an embodiment in which a computer according to the present invention is implemented by using an integrated circuit (IC)
Figure 13:
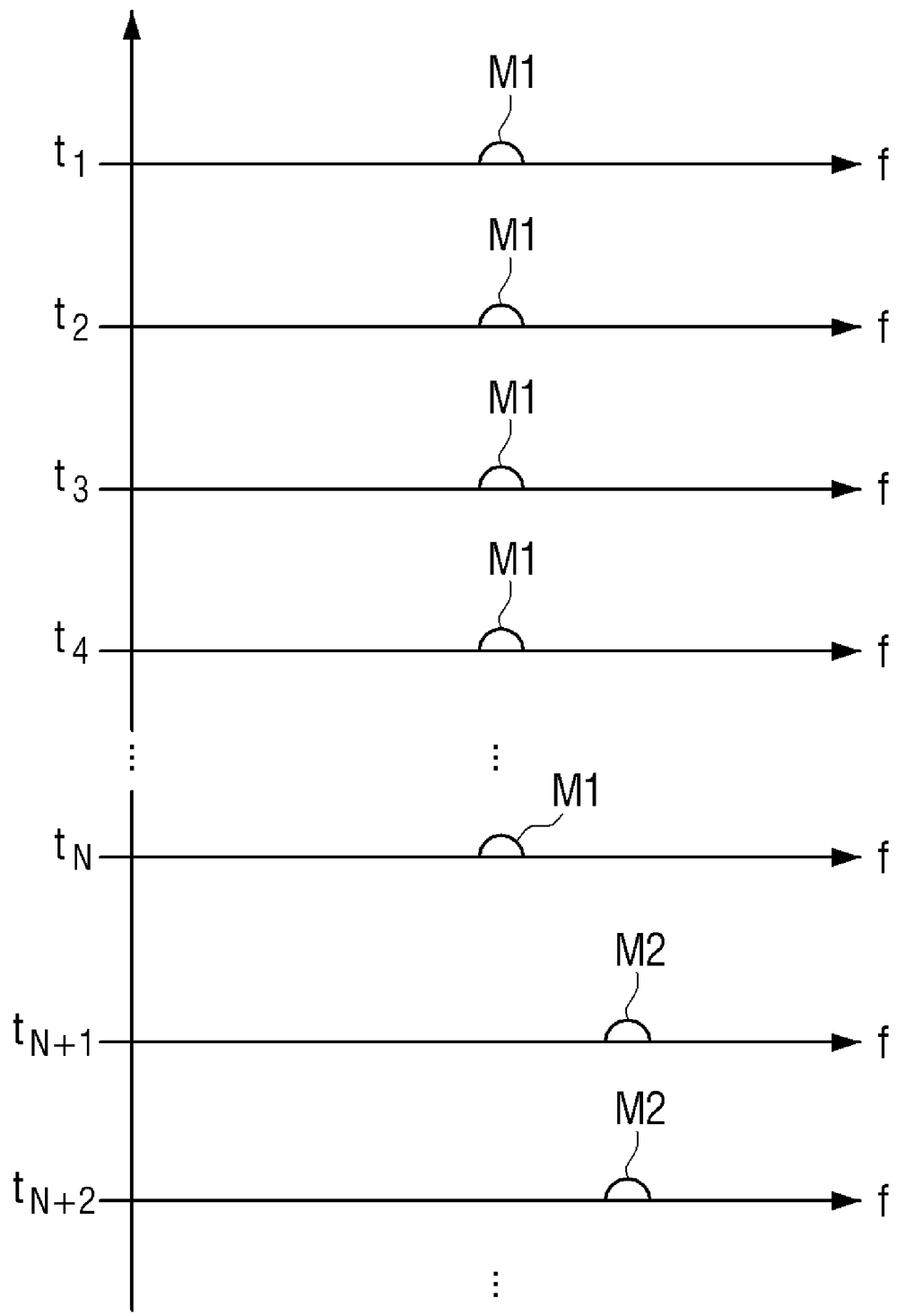
FIG. 13 is a view to illustrate an example of sound waves which are outputted from the sound wave generation device according to an exemplary embodiment of the present invention.

The methods for deactivating or activating the reference pattern described above with reference to FIGS. 6 to 9 can be applied to the embodiments of FIGS. 11 and 13.

Hereinafter, the present invention will be explained in more detail on the assumption that the sound wave illustrated in FIG. 2 is outputted from the sound wave generation device 100 and the computer 200 is operated according to the method described with reference to FIG. 3.

It is assumed that a sound wave having an intensity greater than or equal to a threshold value is measured by the sound wave intensity measurer 202 at time $t_1$ (it is assume that a sound wave M1 has an intensity greater than or equal to a threshold value for convenience of explanation).

The comparator 205 compares the sound waves M1 and S1 having the intensity greater than or equal to the threshold value and measured at time $t_1$, and reference pattern data stored in the memory 207. Herein, the sound wave M1 may have a signal modulated from digital information, and the sound wave S1 may be an analogue signal like a voice.

As a result of the comparing, when the sound wave M1 matches reference pattern data P3, the comparator 205 turns on the computer processor 209.

Under the control of the turned-on computer processor 209, the low-power sound wave reception program performs operations.

When it is determined that the deactivating condition is satisfied, the low-power sound wave reception program may delete, from the memory 207, the reference pattern data P3 matching the sound wave M1 from among the reference pattern data stored in the memory 207, and may store the reference pattern data P3 in another storage 213. Thereafter, the computer processor 209 may finish the operations and then is turned off.

To determine whether the deactivating condition is satisfied or not, digital information may be restored from the sound wave M1 (for example, a restoration program is executed under the control of the turned-on computer processor 209). When the digital information is successfully restored, it is determined that the deactivating condition is satisfied. The low-power sound wave reception program deactivates the reference pattern when the deactivating condition is satisfied.

Time elapses and the comparator 205 compares the sound wave M1 having the intensity greater than or equal to the threshold hold and measured at time $t_2$ and the reference pattern data stored in the memory 207.

Since the reference pattern data matching the sound wave M1 has been deleted from the memory 207, the comparator 205 cannot find the reference pattern data matching the sound wave M1. Accordingly, the computer processor 209 may be still maintained in the off state.

In addition, the comparator 205 cannot find the reference pattern data matching the sound wave M1 measured at time $t_3$ or $t_4$. Accordingly, the computer processor 209 may be still maintained in the off state at time $t_3$ or $t_4$.

At time $t_{N+1}$, the comparator 205 compares the sound waves M2 and S2 measured at time $t_{N+1}$ and having the intensity greater than or equal to the threshold value and the reference pattern data stored in the memory 207. As a result of the comparing, when there exists reference pattern data P2 matching the sound wave M2, the comparator 205 may turn on the computer processor 209.

Under the control of the turned-on computer processor 209, the low-power sound wave reception program performs operations.

When it is determined that the deactivating condition is satisfied, the low-power sound wave reception program may delete, from the memory 207, the reference pattern data P2 matching the sound wave M2 from among the reference pattern data stored in the memory 207, and may store the reference pattern data P2 in another storage 213. Thereafter, the computer processor 209 finishes the operations and then is turned off.

To determine whether the deactivating condition is satisfied or not, digital information may be restored from the sound wave M2 (for example, the restoration program is executed under the turned-on computer processor 209). When the digital information is successfully restored, it is determined that the deactivating condition is satisfied. When the deactivating condition is satisfied, the low-power sound wave reception program deactivates the reference pattern.

Time elapses and the comparator 205 compares the sound wave M2 having the intensity greater than or equal to the threshold value and measured at time $t_{N+2}$ and the reference pattern data stored in the memory 207. Since the reference pattern data matching the sound wave M2 has been already deleted from the memory 207, the comparator 205 cannot find the reference pattern data matching the sound wave M2. Accordingly, the computer processor 209 may be still maintained in the off state.

In another example, the present invention will be explained on the assumption that the sound wave signal illustrated in FIG. 2 is outputted from the sound wave generation device 100 and the computer 200 is operated according to the method of FIG. 5.

It is assumed that a sound wave having an intensity greater than or equal to a threshold value is measured by the sound wave intensity measurer 202 at time $t_1$ (it is assume that a sound wave M1 has an intensity greater than or equal to a threshold value for convenience of explanation).

The comparator 205 compares the sound waves M1 and S1 measured at time $t_1$ and reference pattern data stored in the memory 207. Herein, the sound wave M1 has a signal modulated from digital information, and the sound wave S1 may be an analogue signal like a voice. Herein, the sound wave M1 may have a frequency than that of the sound wave S1.

As a result of the comparing, when there exists reference pattern data P3 matching the sound wave M1, the comparator 205 turns on the computer processor 209.

Under the control of the turned-on computer processor 209, the low-power sound wave reception program performs operations.

When the deactivating condition is satisfied, the low-power sound wave reception program may delete the reference pattern data P3 stored in the memory 207 from the memory 207, and store the reference pattern data P3 in another storage 213. Thereafter, the computer processor 209 finishes the operations and then is turned off.

To determine whether the deactivating condition is satisfied or not, digital information may be restored from the sound wave M1 (for example, the restoration program is executed under the turned-on computer processor 209). When the digital information is successfully restored, it is determined that the deactivating condition is satisfied. When the deactivating condition is satisfied, the low-power sound wave reception program deactivates the reference pattern.

Thereafter, the comparator 205 compares the sound wave M1 having the intensity greater than or equal to the threshold value and measured at time $t_2$ and the reference pattern data stored in the memory 207. Since the reference pattern data P3 matching the sound wave M1 has been already deleted from the memory 207, the comparator 205 cannot find the reference pattern data matching the sound wave M1. Accordingly, the computer processor 209 may be still maintained in the off state.

In the same way, the comparator cannot find the reference pattern data matching the sound wave M1 measured at time $t_3$ or $t_4$.

At time $t_{N+1}$, the comparator 205 compares the sound waves M2 and S2 measured at time $t_{N+1}$ and the reference pattern data stored in the memory 207. As a result of the comparing, when there exists the reference pattern data P2 matching the sound wave M2, the comparator 205 turns on the computer processor 209.

Under the control of the turned-on computer processor 209, the low-power sound wave reception program performs operations.

When the deactivating condition is satisfied, the low-power sound wave reception program may delete, from the memory 207, the reference pattern data P2 matching the sound wave M2 from the reference pattern data stored in the memory 207, and store the reference pattern data P2 in another storage 213. In addition, the low-power sound wave reception program may store the deactivated reference pattern data P3 which is stored in the storage 213 in the memory 207. Thereafter, the computer processor 209 finishes the operations and then is turned off.

To determine whether the deactivating condition is satisfied or not, digital information may be restored from the sound wave M2 (for example, the restoration program is executed under the turned-on computer processor 209). When the digital information is successfully restored, it is determined that the deactivating condition is satisfied. When the deactivating condition is satisfied, the low-power sound wave reception program deactivates the reference pattern.

Thereafter, the comparator 205 compares the sound wave M2 measured at time $t_{N+2}$ and the reference pattern data stored in the memory 207. Since the reference pattern data P2 matching the sound wave M2 has been already deleted from the memory 207, the comparator 205 cannot find the reference pattern data matching the sound wave M2. Accordingly, the computer processor 209 may be still maintained in the off state.

According to an exemplary embodiment of the present invention, the computer 200 may be implemented by using one or more integrated circuits (ICs).

FIG. 11 is a view to illustrate the computer 200 which is implemented by using a single IC according to an exemplary embodiment of the present invention.

Referring to FIG. 11, the computer 200 may include a microphone 301 and a computer processor 309 which is implemented by using an IC. Herein, the computer processor 309 may be an application processor, for example.

The computer processor 309 may include a sound wave intensity measurer 302, an ADC 303, a comparator 305, a memory 307 which stores at least one reference pattern P, a microprocessor 315, and a memory 317 in which a low-power sound wave reception management computer program C 313 is loaded and operated. These elements perform the same or similar functions as the elements having similar reference numerals in FIG. 1.

Although not shown, the computer processor 309 may further include a storage which stores various programs (for example, a low-power sound wave reception management computer program or a restoration program) and data necessary for operating these programs.

The low-power sound wave reception management computer program C 313 may be loaded into the memory 317 and operated under the control of the microprocessor 315.

The low-power sound wave reception management computer program C 313 deactivates a corresponding reference pattern when the deactivating condition is satisfied.

In the embodiment of FIG. 11, the low-power sound wave reception management computer program C 313 is loaded into the memory 317 and operated. Alternatively, the low-power sound wave reception management computer program C 313 may be loaded into the memory 307 and operated.

In addition, in the embodiment of FIG. 11, the sound wave intensity measurer 302 and/or the ADC 303 are included in the computer processor 309. Alternatively, the sound wave intensity measurer 302 and/or the ADC 303 may not be included in the computer processor 309 and may be provided separately.

Although not shown, the computer processor 309 may further include a restoration unit for restoring digital information from a sound wave. The restoration unit may be implemented by using hardware or a program. When the restoration unit is implemented by using a program and the computer processor 309 is turned on, the restoration unit may be loaded into the memory 317 or the memory 307 and may restore digital information from a sound wave.

When the digital information is successfully restored, it is determined that the inactivation condition is satisfied. The restoration unit or the low-power sound wave reception management computer program C 313 may determine whether the digital information is successfully restored or not. For example, the restoration unit or the low-power sound wave reception management computer program C 313 may determine whether the digital information is successfully restored or not using additional information (for example, error detection information) included in the sound wave.

When the restoration unit is implemented by using hardware and the computer processor 309 is turned on, the restoration unit may restore the digital information from the sound wave. Alternatively, when the restoration unit is implemented by using hardware, the restoration unit may be executed before the computer processor 309 is turned on. Subsequent operations are the same as those when the restoration unit is implemented by using a program, and thus a description thereof is omitted.

Figure 12:
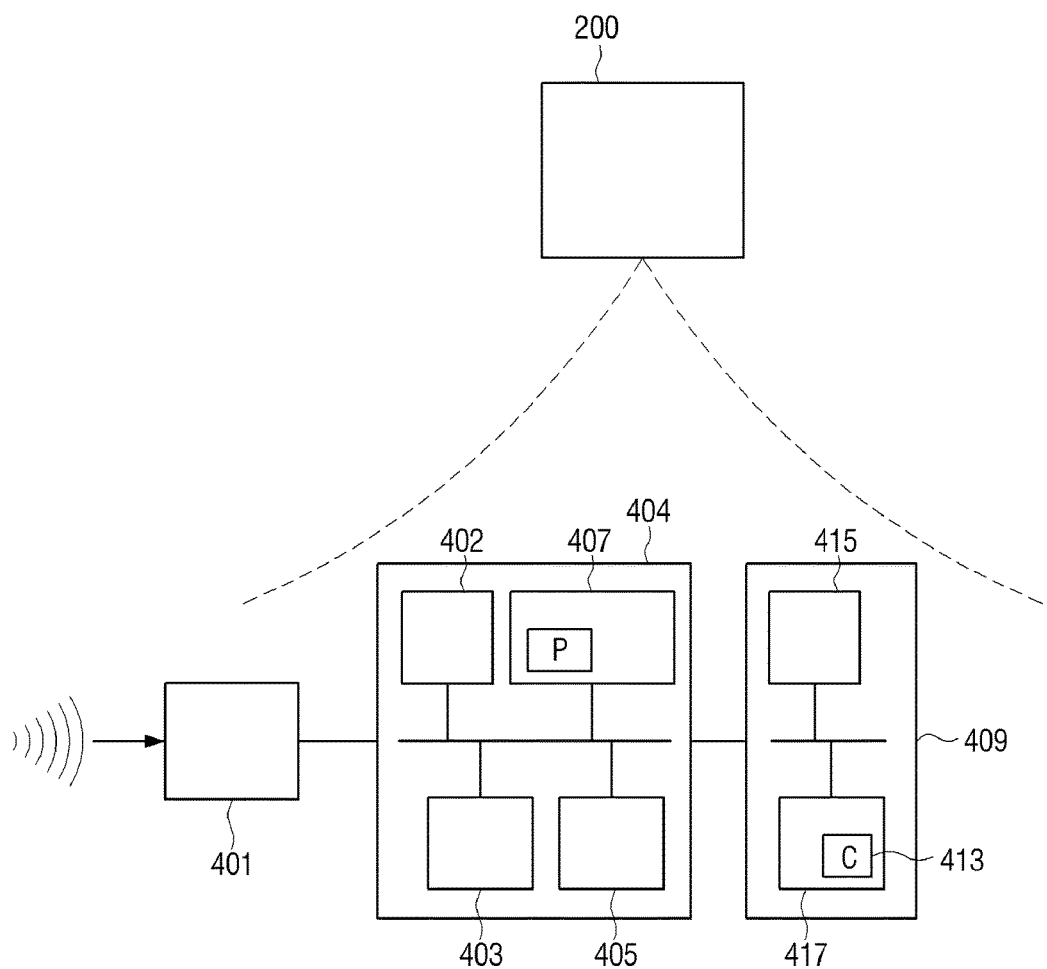
FIG. 12 is a view to illustrate another embodiment in which a computer according to the present invention is implemented by using an IC.

FIG. 12 is a view to illustrate the computer 200 which is implemented by using two ICs according to an exemplary embodiment of the present invention.

Referring to FIG. 12, the computer 200 may include a microphone 401, a sound wave intensity measurer 402, a reference pattern comparison IC 404 for comparing a sound wave and a reference pattern, and a computer processor 409. Herein, the computer processor 409 may be implemented by using an IC, and may be an application processor, for example.

The reference pattern comparison IC 404 may include the sound wave intensity measurer 402, an ADC 403, a comparator 405, and a memory 407 which stores at least one reference pattern P.

The computer processor 409 may include a microprocessor 415 and a memory 417 in which a low-power sound wave reception management computer program C 413 is loaded and operated. These elements may perform the same or similar functions as the elements having similar reference numerals in FIG. 1.

In addition, although not shown in FIG. 12, the computer processor 409 may further include a storage which stores various programs (for example, a low-power sound wave reception management computer program or a restoration program) and data necessary for operating these programs.

The low-power sound wave reception management computer program C 413 may be loaded into the memory 417 and operated under the control of the microprocessor 415.

The low-power sound wave reception management computer program C 413 deactivates a corresponding reference pattern when the deactivating condition is satisfied.

In the embodiment of FIG. 12, the low-power sound wave reception management computer program C 413 is loaded into the memory 417 and operated. Alternatively, the low-power sound wave reception management computer program C 413 may be loaded into the memory 407 and operated.

The reference pattern comparison IC 404 for comparing a reference pattern and a sound wave turns on the computer processor 409 when a sound wave matches a reference pattern.

Although not shown in FIG. 11, the computer processor 409 may further include a restoration unit which restores digital information from a sound wave. The restoration unit may be implemented by using hardware or a program. When the restoration unit is implemented by using a program and the computer processor 409 is turned on, the restoration unit may be loaded into the memory 417 or the memory 407 and restore digital information from a sound wave.

When the digital information is successfully restored, it is determined that the deactivating condition is satisfied. The restoration unit or the low-power sound wave reception management computer program C 413 may determine whether the digital information is successfully restored or not. For example, the restoration unit or the low-power sound wave reception management computer program C 413 may determine whether the digital information is successfully restored or not using additional information (for example, error detection information) included in the sound wave.

In addition, when the restoration unit is implemented by using hardware and the computer processor 409 is turned on, the restoration unit restores the digital information from the sound wave. Alternatively, when the restoration unit is implemented by using hardware, the restoration unit may be executed before the computer processor 309 is turned on. Subsequent operations are the same as those when the restoration unit is implemented by using a program, and thus a description thereof is omitted.

In the present specification, the term "IC" refers to an IC including at least one of the following elements:

a sound wave intensity measurer, an ADC, a comparator, a memory which stores at least one reference patterns P, a microprocessor, a memory which stores a low-power sound wave reception management computer program C, and a restoration unit.

In the present exemplary embodiment, two ICs are provided. However, this is merely an example and the reference pattern comparison IC 404 may be implemented by using two or more ICs.

Figure 3:
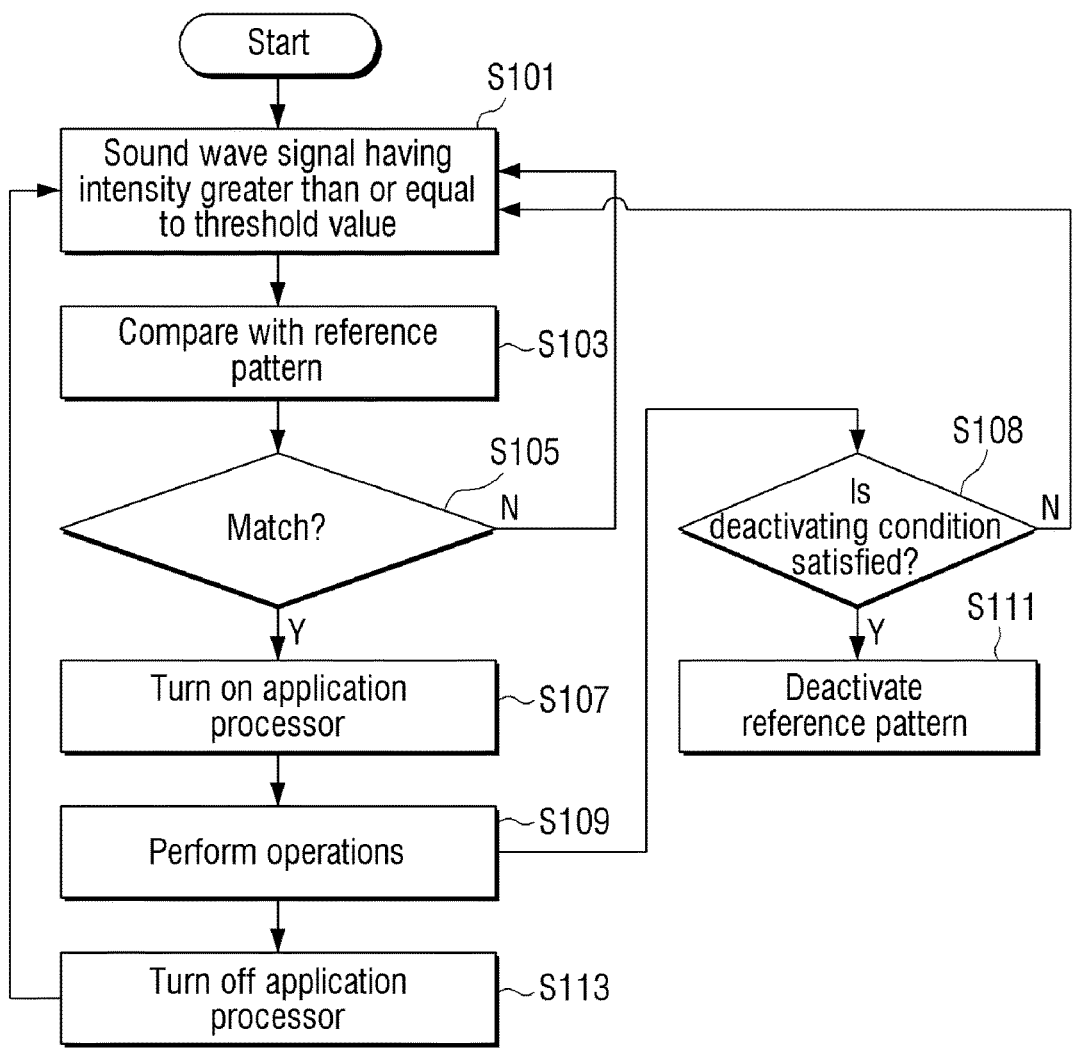
FIG. 3 is a view to illustrate a low-power sound wave reception method according to an exemplary embodiment of the present invention.

FIG. 3 is a view to illustrate a low-power sound wave reception method according to an exemplary embodiment of the present invention.

Referring to FIG. 3, the low-power sound wave reception method according to an exemplary embodiment of the present invention may be applied to a sound wave reception system which receives a sound wave outputting signals repeatedly as shown in FIG. 2.

Hereinafter, the low-power sound wave reception method according to an exemplary embodiment of the present invention will be explained on the assumption that the method is applied to the low-power sound wave reception system explained above with reference to FIG. 1.

Referring to FIG. 3, the low-power sound wave reception method according to an exemplary embodiment of the present invention may include the steps of: measuring, by the sound wave intensity measurer 202, a sound wave (for example, a sound wave which includes a signal modulated from digital information) having an intensity greater than or equal to a threshold value (S101); comparing, by the comparator 205, the sound wave signal which is measured as having the intensity greater than or equal to the threshold value in step 101, and at least one reference pattern stored in the memory 207 (S103); when there exists a matching reference pattern as a result of the comparing in step S103, turning on, by the comparator 205, the AP 209 (S107); loading a predetermined program and performing operations under the control of the turned-on AP 209 (S109); determining whether a deactivating condition is satisfied or not (S108); when the deactivating condition is satisfied, deactivating the reference pattern matching the sound wave signal (S111); and turning off the AP 209 which finishes the operations (S113).

When there exists no matching reference pattern as a result of the comparing in step S103 or when the deactivating condition is not satisfied (S108: N), steps S101 to 105 are repeated.

Corresponding operations in the steps in FIG. 3 have been described with reference to FIG. 1, so please refer to the explanation of FIG. 1.

According to an exemplary embodiment of the present invention, the method including at least part of the steps explained in FIG. 3 may be provided through a computer readable medium which records a program for being executed in the computer 200. For example, steps S108, S109, S111, and S113 may be provided through a computer readable medium which records a program for being executed in the computer 200.

Figure 4:
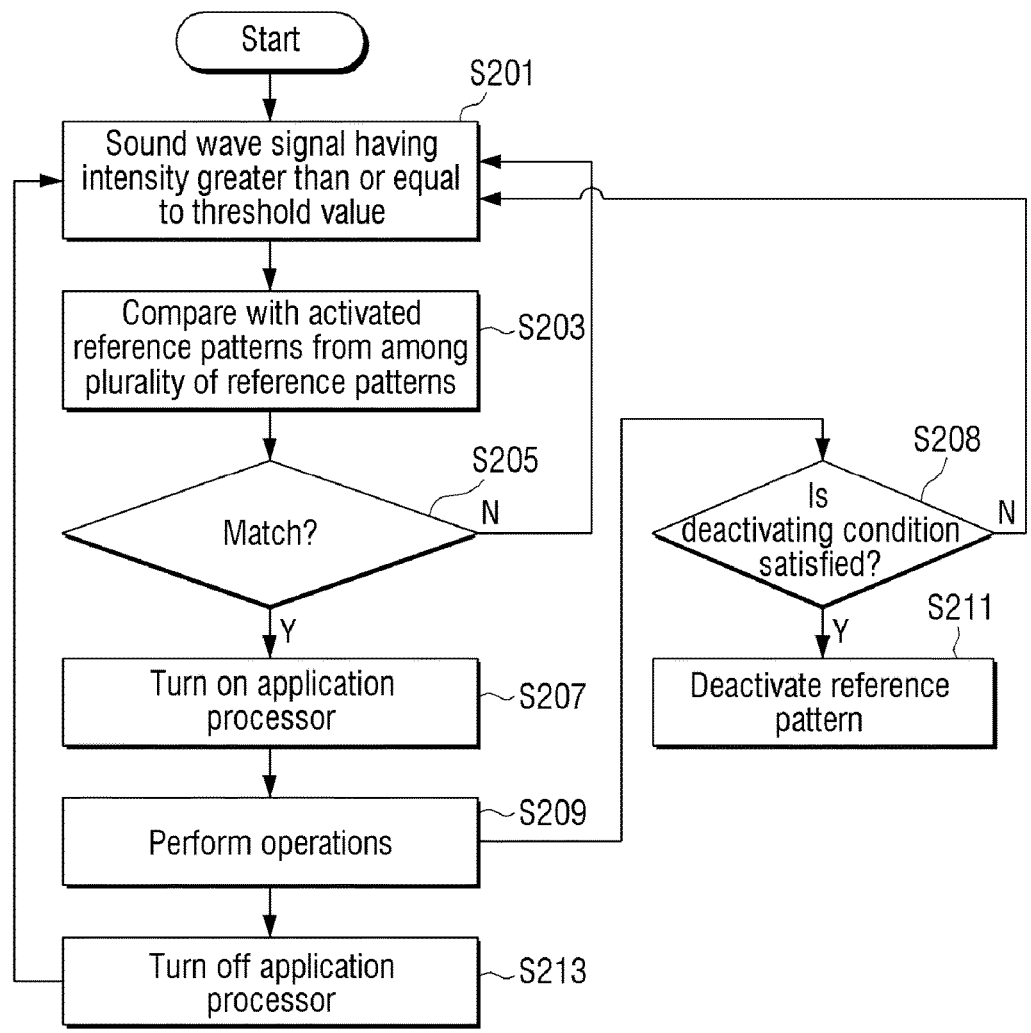
FIG. 4 is a view to illustrate a low-power sound wave reception method according to another exemplary embodiment of the present invention.

FIG. 4 is a view to illustrate a low-power sound wave reception method according to another exemplary embodiment of the present invention.

Hereinafter, the low-power sound wave reception method of FIG. 4 will be explained on the assumption that the method is applied to the low-power sound wave reception system explained above with reference to FIG. 1.

Referring to FIG. 4, the low-power sound wave reception method according to an exemplary embodiment of the present invention may include the steps of: measuring, by the sound wave intensity measurer 202, a sound wave (for example, a sound wave which includes a signal modulated from digital information) having an intensity greater than or equal to a threshold value (S301); comparing, by the comparator 205, the sound wave signal which is measured as having the intensity greater than or equal to the threshold value in step 201, and activated reference patterns from among a plurality of reference patterns stored in the memory 207 (S203); when there exists a matching reference pattern as a result of the comparing in step S203, turning on, by the comparator 205, the AP 209 (S207); loading a predetermined program and performing operations under the control of the turned-on AP 209 (S209); determining whether a deactivating condition is satisfied or not (S208); when the deactivating condition is satisfied, deactivating the reference pattern matching the sound wave signal (S211); and turning off the AP 209 which finishes the operations (S213).

When there exists no matching reference pattern as a result of the comparing in step S203 or when the deactivating condition is not satisfied (S208: N), steps S201 to 205 are repeated.

According to an exemplary embodiment of the present invention, the method including at least part of the steps explained in FIG. 4 may be provided through a computer readable medium which records a program for being executed in the computer 200. For example, steps S208, S209, S211, and S213 may be provided through a computer readable medium which records a program for being executed in the computer 200.

Corresponding operations in the steps in FIG. 4 have been described with reference to FIG. 1, so please refer to the explanation of FIG. 1.

Figure 5:
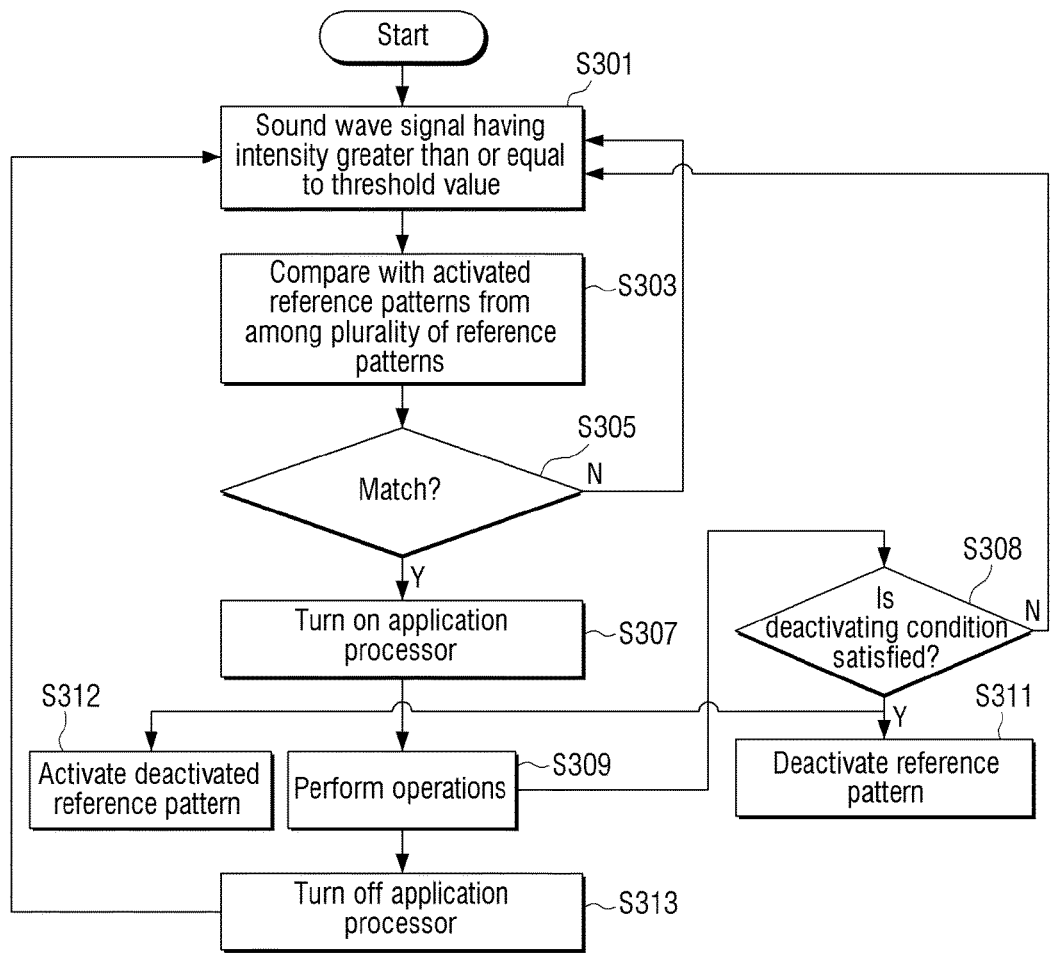
FIG. 5 is a view to illustrate a low-power sound wave reception method according to another exemplary embodiment of the present invention.

FIG. 5 is a view to illustrate a low-power sound wave reception method according to another exemplary embodiment of the present invention.

Hereinafter, the low-power sound wave reception method of FIG. 5 will be explained on the assumption that the method is applied to the low-power sound wave reception system explained above with reference to FIG. 1.

Referring to FIG. 5, the low-power sound wave reception method according to an exemplary embodiment of the present invention may include the steps of: measuring, by the sound wave intensity measurer 202, a sound wave (for example, a sound wave which includes a signal modulated from digital information) having an intensity greater than or equal to a threshold value (S301); comparing, by the comparator 205, the sound wave signal which is measured as having the intensity greater than or equal to the threshold value in step 301, and activated reference patterns from among a plurality of reference patterns stored in the memory 207 (S303); when there exists a matching reference pattern as a result of the comparing in step S303, turning on, by the comparator 205, the AP 209 (S307); loading a predetermined program and performing operations under the control of the turned-on AP 209 (S309); determining whether a deactivating condition is satisfied or not (S308); when the deactivating condition is satisfied, deactivating the reference pattern matching the sound wave signal (S311); when the deactivation is satisfied, activating an existing reference pattern which has been deactivated (S312); and turning off the AP 209 which finishes the operations (S313). On the other hand, when there exists no matching reference pattern as a result of the comparing in step S303 or when the deactivating condition is not satisfied (S308: N), steps S301 to 305 are repeated.

Steps S311 to S312 may be implemented according to the methods described with reference to FIGS. 7 and 8.

According to an exemplary embodiment of the present invention, the method including at least part of the steps explained in FIG. 5 may be provided through a computer readable medium which records a program for being executed in the computer 200. For example, steps S308, S309, S311, S312, and S313 may be provided through a computer readable medium which records a program for being executed in the computer 200.

Figure 10:
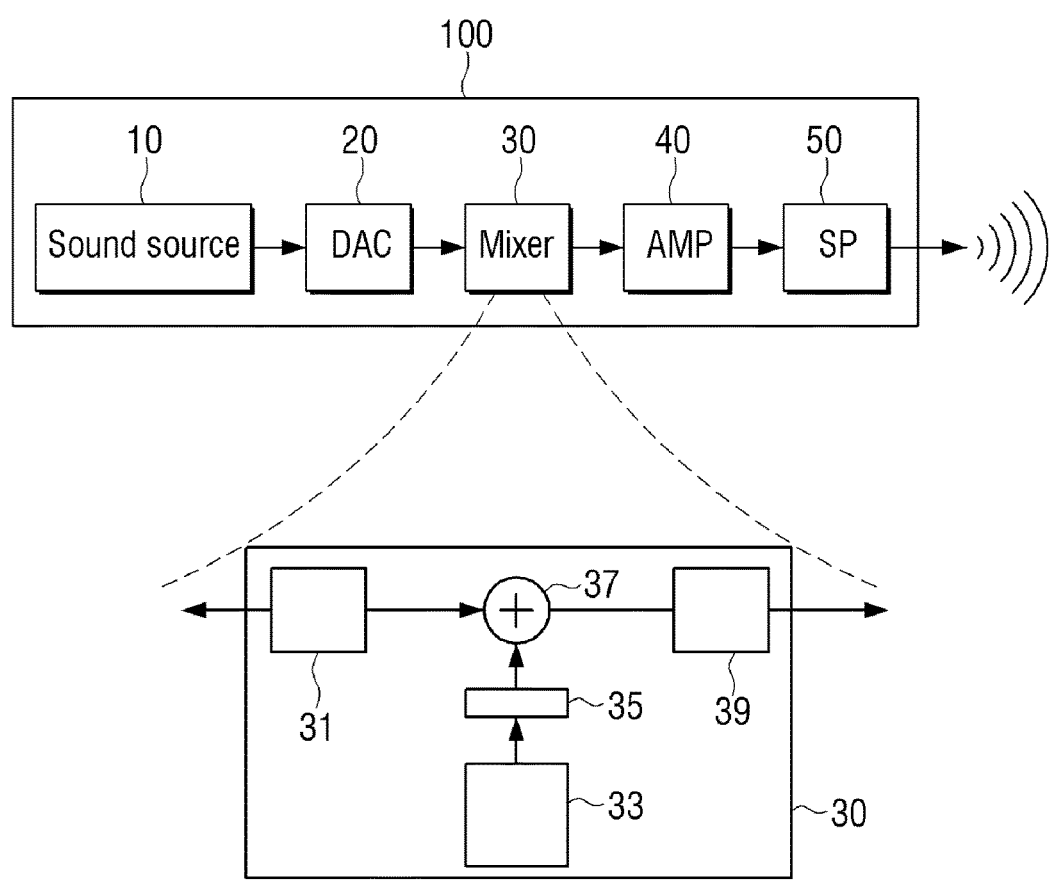
FIG. 10 is a view to illustrate a sound wave generation device which is used in the low-power sound wave reception system according to an exemplary embodiment of the present invention.

FIG. 10 is a view to illustrate a sound wave generation device which is used in a low-power sound wave reception system according to an exemplary embodiment of the present invention.

Referring to FIG. 10, the sound wave generation device 100 according to an exemplary embodiment of the present invention may output a sound wave which repeatedly includes a sound wave (for example, M1 or M2) including a signal modulated from digital information. Herein, the frequency of the sound wave M1 or M2 belongs to a sound wave band.

The sound wave generation device 100 according to an exemplary embodiment of the present invention may include a storage 10 which stores a sound source, a digital-analogue converter (DAC) 20 which converts digital data into an analogue signal, a mixer 30, an amplifier (AMP) 40 which amplifies an analogue signal outputted from the mixer 30 and outputs the signal, and a speaker 50 which receives the signal outputted from the AMP 40 and outputs the signal.

The mixer 30 may include a receiving end 31, a sound wave signal generator 33, a DAC 35, a combiner 37, and an output end 39.

To explain the sound wave generation device 100 according to an exemplary embodiment of the present invention with reference to FIGS. 2 and 10, it is assumed that sound sources (for example, S1, S2, S3, . . . ) stored in the storage 10 are outputted through the DAC 20, the mixer 30, the AMP 40, and the speaker 50 at predetermined time intervals. These sound sources vary like songs or an announcement in a subway station, and have frequency bands which can be heard by human ears.

It is assumed that the sound source S1 stored in the storage 10 is outputted at time $t_1$, the sound source S2 is outputted at time $t_{N+1}$, and the sound source S3 is outputted at time $t_{N+M+1}$.

First, when the sound source S1 is outputted at time $t_1$, the sound source S1 is converted into an analogue signal by the DAC 20. The mixer 30 outputs a mixing signal in which another sound wave signal (for example, a sound wave signal including a signal modulated from digital information (for example, M1)) is inserted into the sound source S1 to the AMP 40. The speaker 50 may receive the signal outputted from the AMP 40 and output the signal to the outside.

There is no sound source outputted from the storage 10 at time $t_2$ (this is because it is assumed that the source sources are outputted at time $t_1$, time $t_{N+1}$, and time $t_{N+M+1}$). The mixer 30 generates a sound wave including the sound wave signal (M1) and outputs the sound wave to the AMP 40 although there is no sound source. As can be seen from FIG. 2, there is no sound source and there is only the sound wave signal (M1) at time $t_2$.

In this way, there is no sound source and the sound wave including only the sound wave signal (M1) is outputted through the speaker 50 until time $t_{N+1}$.

The sound source S2 is outputted at time $t_{N+1}$ and is converted into an analogue signal by the DAC 20. The mixer 30 outputs a mixing signal in which a sound wave signal (for example, a sound wave signal including a signal modulated from digital information (for example, M2)) is inserted into the sound source S2 to the AMP 40. The speaker 50 receives the signal outputted from the AMP 40 and outputs the signal to the outside.

There is no sound source outputted from the storage 10 at time $t_{N+2}$. The mixer 30 generates a sound wave including the sound wave signal (M2) and outputs the sound wave to the AMP 50 although there is no sound source. As can be seen from FIG. 2, there is only the sound wave signal M2 at time $t_{N+2}$.

In the above-described embodiment, the sound sources stored in the storage are outputted. However, a sound wave signal may be mixed with a sound source directly inputted through a microphone, rather than the sound source stored in the storage 10, and may be outputted.

In the above-described embodiment, the sound wave generation device 100 mixes the sound source with the sound wave including the signal modulated from digital information such as M1 or M2, and outputs the sound source. Alternatively, the sound wave generation device 100 according to an exemplary embodiment of the present invention may output a sound wave signal including only a sound wave including a signal modulated from digital information such as M1 or M2 without a sound source.

FIG. 13 is a view to illustrate an example of a sound wave which is outputted from the sound wave generation device used in the low-power sound wave reception system according to an exemplary embodiment of the present invention.

Referring to FIG. 13, a sound wave which has no sound source and has an intensity greater than or equal to a threshold value in a frequency band, such as M1 and M2, (for example, a sound wave including a signal modulated from digital information) is outputted from the sound wave generation device. Herein, the frequency of the sound wave M1 or M2 may be included in a non-audible band or an audible band.

Figure 14:
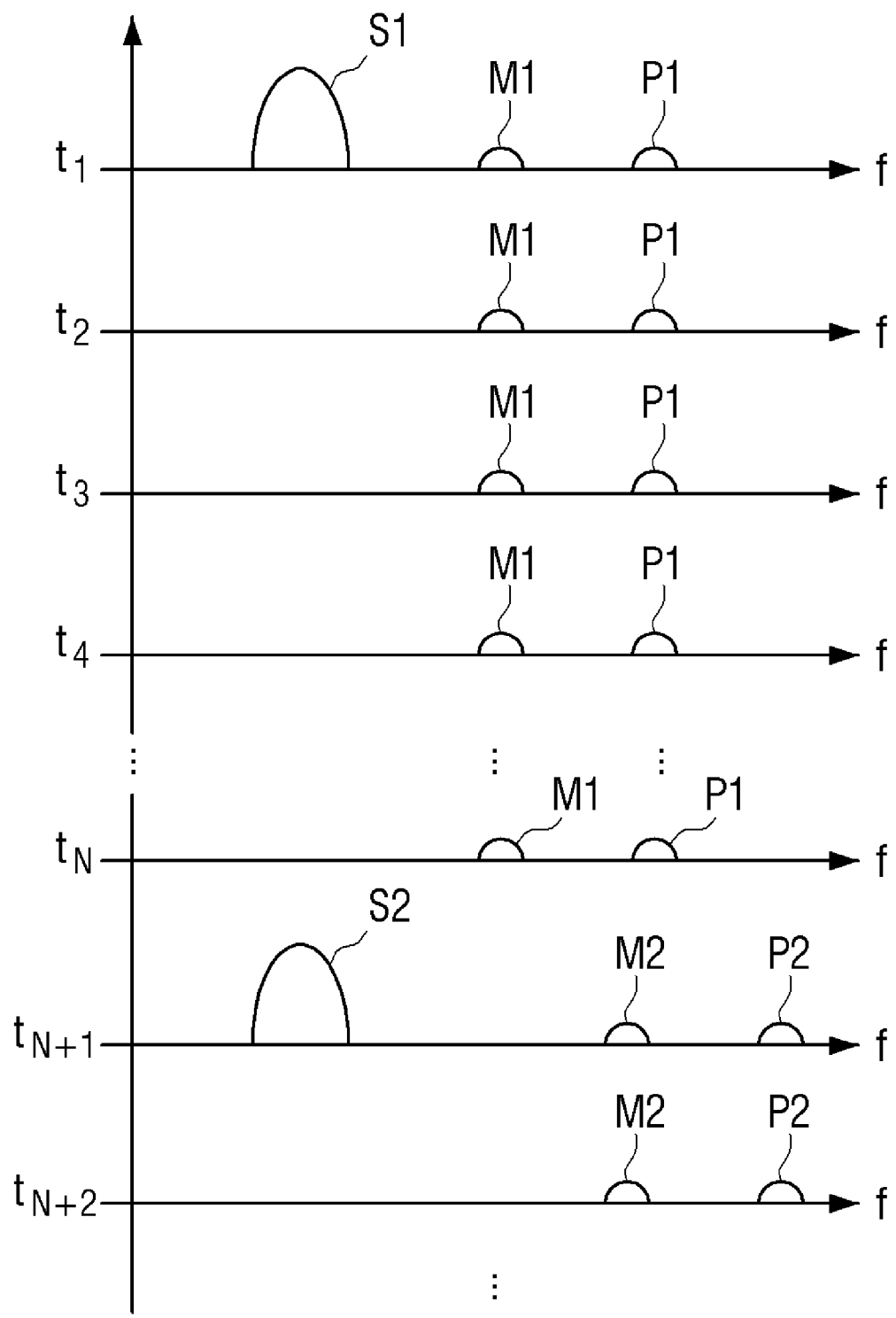
FIG. 14 is a view to illustrate an example of sound waves which are outputted from the sound wave generation device according to an exemplary embodiment of the present invention.

FIG. 14 is a view to illustrate another example of the sound wave which is outputted from the sound wave generation device which is used in the low-power sound wave reception system according to an exemplary embodiment of the present invention.

Referring to FIG. 14, the sound wave outputted from the sound wave generation device 100 includes two non-audible or audible sound waves which include signals modulated from digital information. Although two signals modulated from digital information are illustrated in FIG. 14, this is merely an example and more than two signals may be included.

Figure 15:
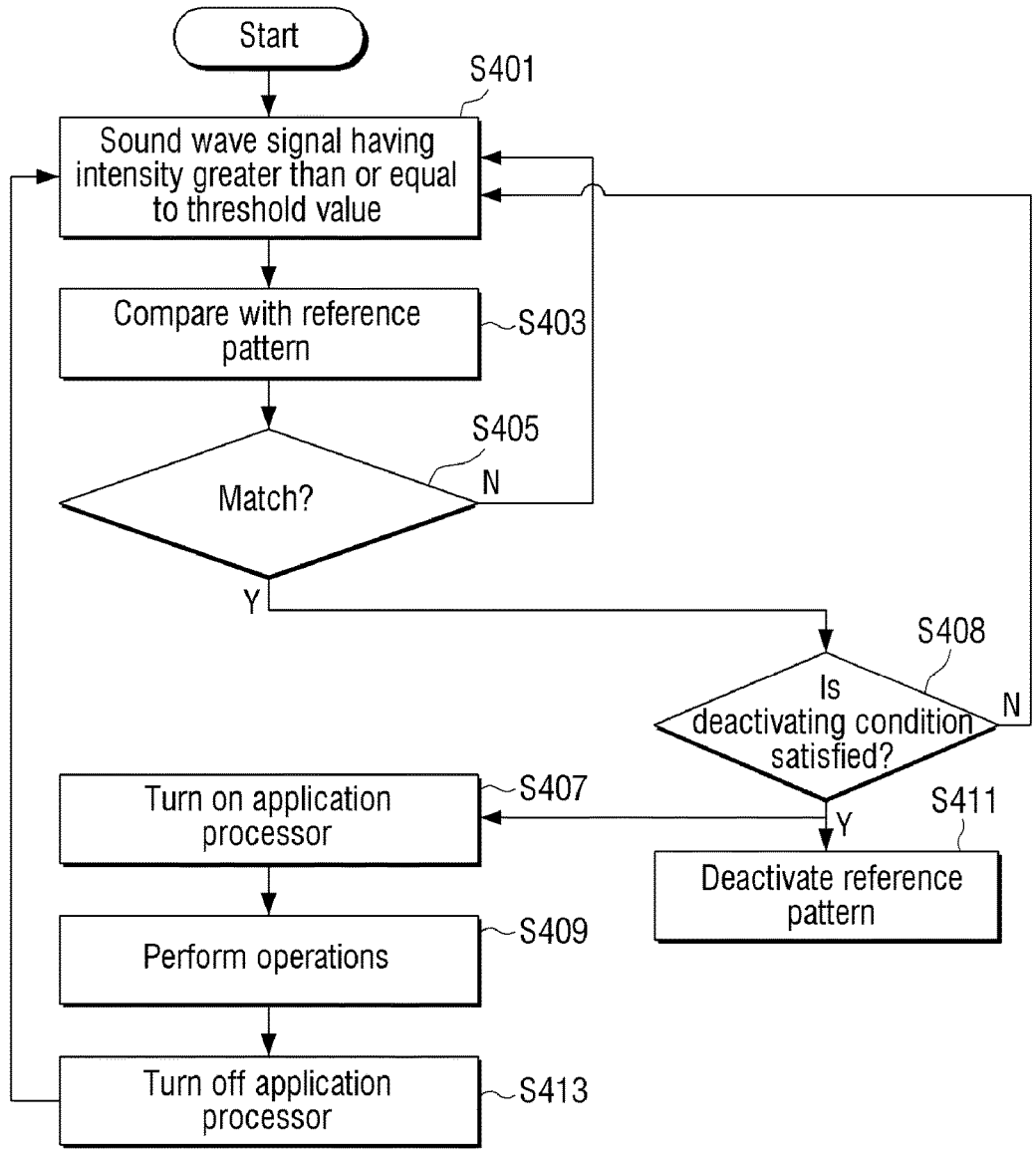
FIG. 15 is a view to illustrate a low-power sound wave reception method according to another exemplary embodiment of the present invention.

FIG. 15 is a view to illustrate a low-power sound wave reception method according to another exemplary embodiment of the present invention.

The method illustrated in FIG. 15 is to explain a case in which a restoration unit for restoring digital information included in a sound wave is implemented by using hardware.

Referring to FIG. 15, the low-power sound wave reception method according to an exemplary embodiment of the present invention is applied to a sound wave reception system which receives a sound wave outputting signals repeatedly as shown in FIG. 2.

Hereinafter, the low-power sound wave reception method according to an exemplary embodiment of the present invention will be explained on the assumption that the method is applied to the low-power sound wave reception system explained with reference to FIG. 1.

Referring to FIG. 15, the low-power sound wave reception method according to an exemplary embodiment of the present invention may include the steps of: measuring, by the sound wave intensity measurer 202, a sound wave having an intensity greater than or equal to a threshold value (for example, a sound wave including a signal modulated from digital information) (S401); comparing, by the comparator 205, the sound wave signal which is measured as having the intensity greater than or equal to the threshold value in step S401, and at least one reference pattern stored in the memory 207 (S403); when there exists a matching reference pattern (S405: Y) as a result of the comparing in step S403, determining, by the comparator 205, whether a deactivating condition is satisfied or not (S408); when the deactivating condition is satisfied, turning on the AP 209 (S407); loading a predetermined program and performing operations under the control of the turned-on AP 209 (S409); when the deactivating condition is satisfied, deactivating the reference pattern matching the sound wave signal (S411); and turning off the AP 209 which finishes the operations (S413).

On the other hand, when there exists no matching reference pattern as a result of the comparing in step S403 or when the deactivating condition is not satisfied (S408: N), steps S401 to 405 may be repeated.

Figure 16:
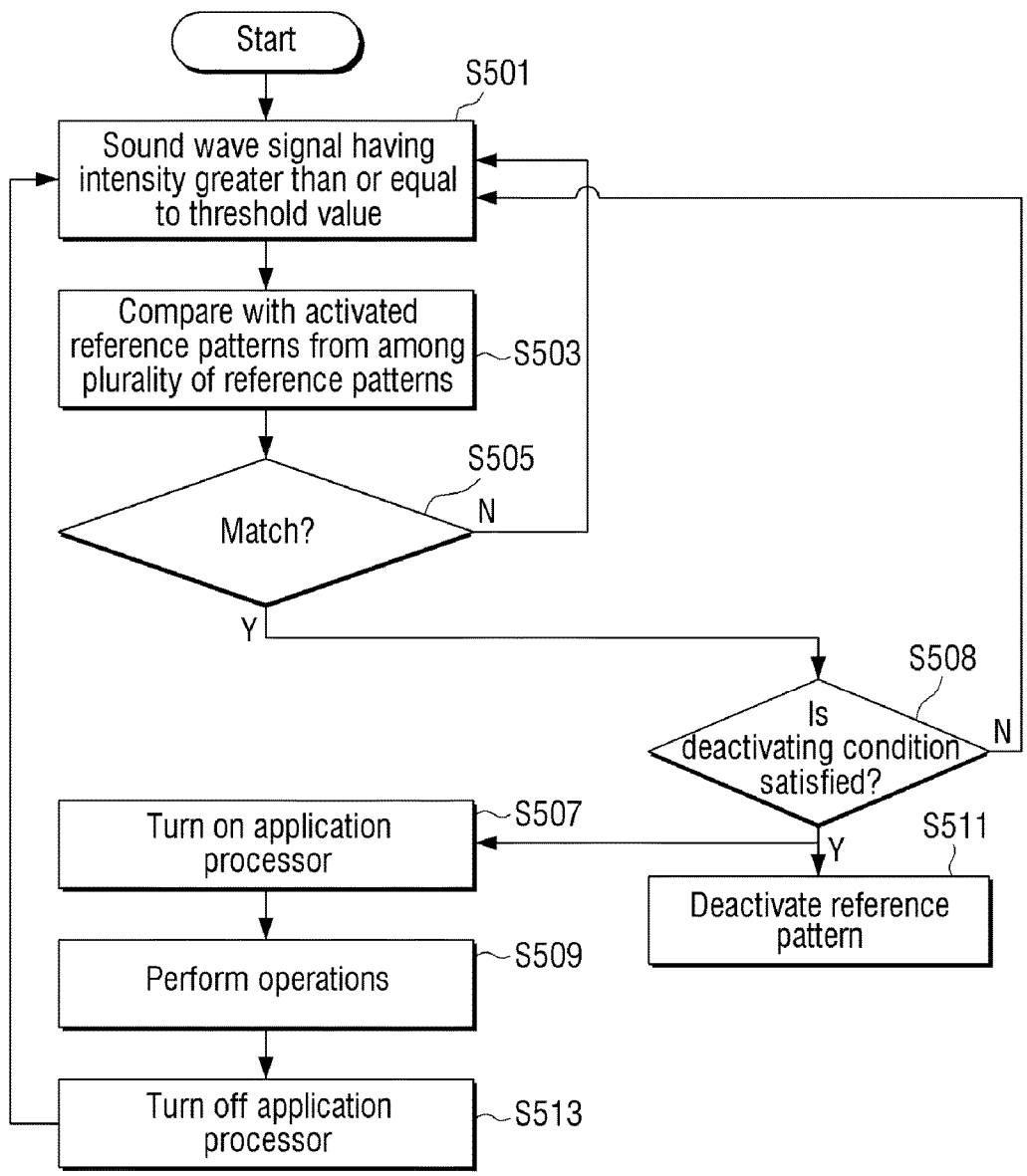
FIG. 16 is a view to illustrate a low-power sound wave reception method according to another exemplary embodiment of the present invention.

FIG. 16 is a view to illustrate a low-power sound wave reception method according to another exemplary embodiment of the present invention.

The method illustrated in FIG. 16 is to explain a case in which a restoration unit for restoring digital information included in a sound wave is implemented by using hardware.

Hereinafter, the low-power sound wave reception method of FIG. 16 will be explained on the assumption that the method is applied to the low-power sound wave reception system explained with reference to FIG. 1.

Referring to FIG. 16, the low-power sound wave reception method according to an exemplary embodiment of the present invention may include the steps of: measuring, by the sound wave intensity measurer 202, a sound wave having an intensity greater than or equal to a threshold value (for example, a sound wave including a signal modulated from digital information) (S501); comparing, by the comparator 205, the sound wave signal which is measured as having the intensity greater than or equal to the threshold value in step S501, and activated reference patterns from among a plurality of reference patterns stored in the memory 207 (S503); when there exists a matching reference pattern as a result of the comparing in step S203, determining, by the comparator 205, whether a deactivating condition is satisfied or not (S508); when the deactivating condition is satisfied, turning on the AP 209 (S507); loading a predetermined program and performing operations under the control of the turned-on AP 209 (S509); when the deactivating condition is satisfied, deactivating the reference pattern matching the sound wave signal (S511); and turning off the AP 209 which finishes the operations (S513).

On the other hand, when there exists no matching reference pattern as a result of the comparing in step S503 or when the deactivating condition is not satisfied (S508: N), steps S501 to 505 may be repeated.

Figure 17:
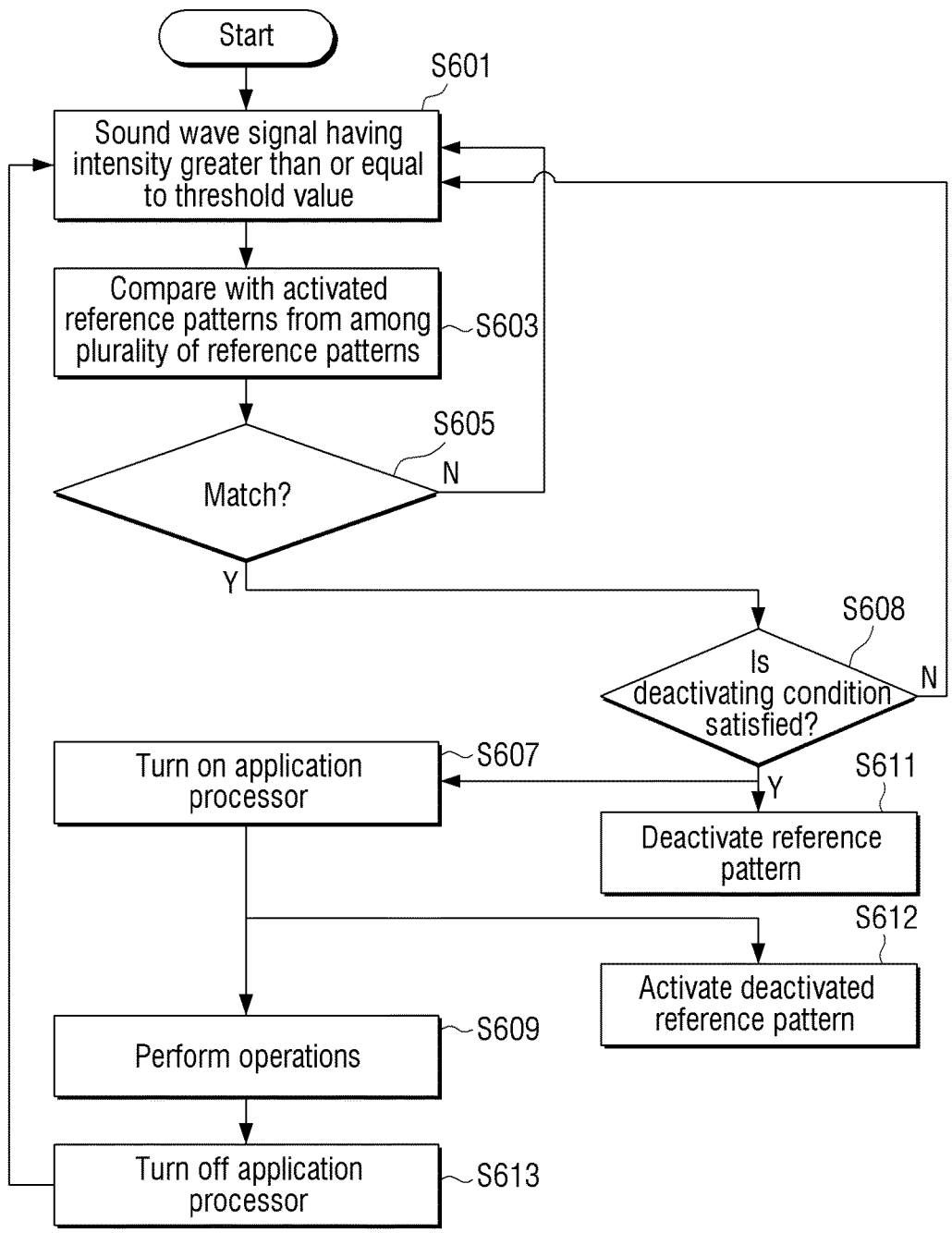
FIG. 17 is a view to illustrate a low-power sound wave reception method according to another exemplary embodiment of the present invention.

FIG. 17 is a view to illustrate a low-power sound wave reception method according to another exemplary embodiment of the present invention.

The method illustrated in FIG. 17 is to explain a case in which a restoration unit for restoring digital information included in a sound wave is implemented by using hardware.

Hereinafter, the low-power sound wave reception method of FIG. 17 will be explained on the assumption that the method is applied to the low-power sound wave reception system explained with reference to FIG. 1.

Referring to FIG. 17, the low-power sound wave reception method according to an exemplary embodiment of the present invention may include the steps of: measuring, by the sound wave intensity measurer 202, a sound wave having an intensity greater than or equal to a threshold value (for example, a sound wave including a signal modulated from digital information) (S601); comparing, by the comparator 205, the sound wave signal which is measured as having the intensity greater than or equal to the threshold value in step S601, and activated reference patterns from among a plurality of reference patterns stored in the memory 207 (S603); when there exists a matching reference pattern as a result of the comparing in step S603, determining, by the comparator 205, whether a deactivating condition is satisfied or not (S608); when the deactivating condition is satisfied, turning on the AP 209 (S607); loading a predetermined program and performing operations under the control of the turned-on AP 209 (S609); when the deactivating condition is satisfied, deactivating the reference pattern matching the sound wave signal (S611); when the deactivating condition is satisfied, activating an existing reference pattern which has been deactivated (S612); and turning off the AP 209 which finishes the operations (S613). On the other hand, when there exists no matching reference pattern as a result of the comparing in step S603 or when the deactivating condition is not satisfied (S608: N), steps S601 to 605 may be repeated.

As described above, when the sound wave having the same information is repeatedly received, the computer processor is not necessarily turned on many times and is turned on once, so that power consumption can be reduced. In particular, the present invention is useful when limited power is used like in a mobile device.

While the invention has been described with reference to certain preferred embodiments thereof and drawings, the present invention is not limited to the above-described embodiments and various changes or modification may be made based on the descriptions provided herein by those skilled in the art.

What is claimed is:

1. A low-power sound wave reception method in a computer which comprises a microphone, a sound wave intensity measurer which measures an intensity of a sound wave detected by the microphone, a memory which stores at least one reference pattern, and a computer processor, the low-power sound wave reception method comprising:
when a sound wave signal having an intensity greater than or equal to a threshold value is measured by the sound wave intensity measurer, comparing the sound wave signal having the intensity greater than or equal to the threshold value and the at least one reference pattern stored in the memory;
when there is a reference pattern matching the sound wave signal having the intensity greater than or equal to the threshold value, turning on the computer processor, and, when a deactivating condition is satisfied, deactivating the reference pattern matching the sound wave signal having the intensity greater than or equal to the threshold value; and
when a predetermined time elapses from a time when the deactivated reference pattern was deactivated, activating the deactivated reference pattern,
wherein the reference pattern which is compared with the sound wave signal having the intensity greater than or equal to the threshold value is an activated reference pattern; and
wherein deactivating the reference pattern includes excluding the reference pattern from comparison objects to be compared with the sound wave signal.

2. The low-power sound wave reception method of claim 1, wherein the deactivating comprises: deleting the reference pattern matching the sound wave signal having the intensity greater than or equal to the threshold value from the memory; and storing the deleted reference pattern in another storage.

3. The low-power sound wave reception method of claim 1, wherein a flag corresponding to the at least one reference pattern stored in the memory and indicating activation/deactivation is stored in the memory, and
wherein the deactivating comprises displaying a flag corresponding to the reference pattern matching the sound wave signal having the intensity greater than or equal to the threshold value in a deactivation state.

4. The low-power sound wave reception method of claim 3, wherein the comparing comprises comparing the sound wave signal having the intensity greater than or equal to the threshold value and the reference pattern which has the activated flag from among the at least one reference patterns stored in the memory.

5. The low-power sound wave reception method of claim 1, wherein the activating comprises activating the deactivated reference pattern every time the computer processor is turned on.

6. A non-transitory computer readable medium including a program on a computer which comprises a microphone, a sound wave intensity measurer which measures an intensity of a sound wave detected by the microphone, a memory which stores at least one reference pattern, and a computer processor, the computer executing the program to perform a method comprising:
measuring, by the sound wave intensity measurer, a sound wave signal having an intensity greater than or equal to a threshold value;
comparing the sound wave signal having the intensity greater than or equal to the threshold value and the at least one reference pattern;
when there is a reference pattern matching the sound wave signal having the intensity greater than or equal to the threshold value as a result of the comparing, turning on the computer processor;
when a deactivating condition is satisfied, deactivating the reference pattern matching the sound wave signal having the intensity greater than or equal to the threshold value; and
when a predetermined time elapses from a time when the deactivated reference pattern was deactivated, activating the deactivated reference pattern;
wherein the reference pattern which is compared with the sound wave signal having the intensity greater than or equal to the threshold value is an activated reference pattern; and
wherein deactivating of the reference pattern includes excluding the reference pattern from comparison objects to be compared with the sound wave signal.

7. The non-transitory computer readable medium of claim 6, wherein deactivating comprises: deleting the reference pattern matching the sound wave signal having the intensity greater than or equal to the threshold value from the memory; and storing the deleted reference pattern in another storage.

8. The non-transitory computer readable medium of claim 6, wherein a flag corresponding to the at least one reference pattern stored in the memory and indicating activation/deactivation is stored in the memory, and
wherein deactivating comprises displaying a flag corresponding to the reference pattern matching the sound wave signal having the intensity greater than or equal to the threshold value in a deactivation state.

9. The non-transitory computer readable medium of claim 6, further comprising:
activating the deactivated reference pattern every time the computer processor is turned on.

* * * * *